(12) United States Patent
Chan et al.

(10) Patent No.: US 7,710,502 B2
(45) Date of Patent: May 4, 2010

(54) METHOD AND APPARATUS FOR DETECTING CHROMA FIELD MOTION IN A VIDEO SIGNAL

(75) Inventors: Yee Shun Chan, Markham (CA); Dennis Kin-Wah, Toronto (CA)

(73) Assignee: Zoran Corporation, Sunnyvale, CA (US)

( * ) Notice: Subject to any disclaimer, the term of this patent is extended or adjusted under 35 U.S.C. 154(b) by 1083 days.

(21) Appl. No.: 11/384,181

(22) Filed: Mar. 17, 2006

(65) Prior Publication Data

US 2007/0217509 A1 Sep. 20, 2007

(51) Int. Cl.
*H04N 9/78* (2006.01)
*H04N 5/14* (2006.01)

(52) U.S. Cl. .................. 348/668; 348/669; 348/702

(58) Field of Classification Search ......... 348/663–670, 348/702, 624; 386/22, 25
See application file for complete search history.

(56) References Cited

U.S. PATENT DOCUMENTS

| | | | | |
|---|---|---|---|---|
| 5,146,318 A * | 9/1992 | Ishizuka et al. | ............. | 348/669 |
| 5,305,120 A | 4/1994 | Faroudja | | |
| 5,325,186 A * | 6/1994 | Ishizuka et al. | ............. | 348/663 |
| 5,502,509 A * | 3/1996 | Kurashita et al. | ........... | 348/669 |
| 5,541,669 A | 7/1996 | Yamaguchi et al. | | |
| 5,596,418 A * | 1/1997 | Strolle et al. | .................... | 386/9 |
| 5,835,162 A * | 11/1998 | Inoue et al. | ................. | 348/669 |
| 6,253,022 B1 * | 6/2001 | Strolle et al. | ................ | 386/109 |
| 6,288,754 B1 | 9/2001 | Ito | | |
| 6,462,790 B1 | 10/2002 | Lowe et al. | | |
| 6,795,126 B1 | 9/2004 | Lee | | |
| 7,453,525 B2 * | 11/2008 | Renner et al. | ............... | 348/702 |
| 7,532,254 B1 * | 5/2009 | Woodall | ..................... | 348/609 |
| 2004/0032535 A1 | 2/2004 | Ogawa | | |
| 2004/0189875 A1 * | 9/2004 | Zhai et al. | .................... | 348/669 |
| 2005/0134745 A1 | 6/2005 | Bacche et al. | | |
| 2005/0168650 A1 * | 8/2005 | Walls et al. | ................. | 348/666 |
| 2007/0109448 A1 * | 5/2007 | Winger et al. | ............... | 348/624 |
| 2009/0091659 A1 * | 4/2009 | Tanigawa | .................... | 348/624 |

\* cited by examiner

*Primary Examiner*—Victor Kostak
(74) *Attorney, Agent, or Firm*—Lando & Anastasi, LLP

(57) ABSTRACT

A method and apparatus for blending a video signal responsive to a chroma motion result is disclosed. The method and apparatus are configured to determine whether any chroma motion exists within the video signal and providing the chroma motion result, to provide a first blending signal based on the chroma motion result; to provide a second blending signal based on the chroma motion result; to modulate temporal filtered luma and chroma components of the video signal with the first blending signal, to modulate spatial filtered luma and chroma components of the video signal with the second blending signal, and to add the modulated temporal luma and chroma signals to the modulated spatial luma and chroma signals to provide a blended video signal.

52 Claims, 17 Drawing Sheets

METHOD AND APPARATUS FOR DETECTING CHROMA FIELD MOTION IN A VIDEO SIGNAL

BACKGROUND OF INVENTION

1. Field of Invention

Aspects of the present invention are directed to luminance and chrominance separation processing of a video signal, and more particularly to determining chroma motion within fields and across fields of a video signal.

2. Discussion of Related Art

Transitioning from analog over-the-air television (TV) to digital TV is a United States telecommunications goal. At the time of writing this application, Congress has passed a bill that set a date for the transitioning from analog to digital over-the-air television to Feb. 17, 2009, with the final step being the President had yet to sign the bill. If the bill is passed, the result will be that analog broadcast stations operating in the United States must convert to a digital broadcast format by this date. One result is that all consumers that receive over-the-air analog TV broadcasts must be able to receive digital TV (DTV) signals by this date or they will no longer be able to receive TV signals. There are estimates that fifteen percent of the households in the United States rely on over-the-air reception of analog TV signals and will therefore lose their TV service by this date, unless they have television sets that are capable of receiving DTV signals. The fifteen percent number is due, in part, to the expense of DTV receivers and the lack of affordable digital-to-analog converters boxes for analog TV sets. Further, the lack of inexpensive DTV converter boxes will affect the transition of second and third analog TV sets to the DTV format in the consumer's home. Accordingly, there is a need for a low cost converter bus to convert over-the-air DTV format to CST analog TV format.

In the National TV Systems Committee (NTSC) standard for television transmission, RGB (Red, Green, Blue) signals from a television camera are converted into a luma signal and a chroma signal to allow for efficient transmission. The luma signal, which is typically labeled with a Y, represents the brightness and maximum detail of a picture. The chroma signal is a combination of two color differences R–Y (Red minus Y) and B–Y (Blue minus Y). These color difference signals are used to modulate the phase and the amplitude of a 3.58 MHz sub-carrier signal. The phase modulation represents the hue, or specific color intended, where the amplitude modulation of this signal represents the intensity, or saturation, of the color difference signal. The frequency of the sub-carrier signal is chosen such that the chroma signal can be frequency interleaved with the luma signal to generate a composite video base band signal (CVBS).

When a television set receives the NTSC CVBS signal, the composite signal is decoded in a decoder to separate the luma and chroma signals. The chroma signal is then demodulated to the R–Y and B–Y component signals that can be used to recreate the RGB signals to be displayed on the television screen. Since the luma and chroma signals share the same bandwidth at around 3.58 MHz and the luma and chroma signals are not prefiltered before they are added together, the luma and chroma signals cannot be fully separated in the decoding process. Thus, as a result of crosstalk between the luma and chroma signals, various decoding artifacts can be present. A number of methods have been designed to achieve better separation of luma and chroma signals during the decoding process in order to minimize the decoding artifacts. For example, there are two well-known methods for separating the luma and chroma signals which involve filters that are designed to discern one portion of the CVBS signal from the other. The first method uses a notch/bandpass filter, and the second method uses a comb filter. These methods are described, for example, in published U.S. application no. US2005/0134745 A1, herein incorporated by reference. As is described in more detail in this reference, the drawback of the notch/bandpass filter approach is that luma resolution is lost and heavy display artifacts result when the high frequency luma signal provided by the filter is treated as a chroma signal thereby producing a known "rainbow pattern" artifact, and a dot crawl artifact results when a high frequency chroma signal is considered to be a luma signal.

Comb filtering methods are based on the sub-carrier signal phase, which is reversed by 180° between two adjacent lines in a frame/field of the CVBS (thereby also between two adjacent frames, since there is an odd number of lines within a frame). There are two types of comb filtering: line comb filtering and frame comb filtering. For both methods, the basic concept involves adding or subtracting two signals that have the chroma phase reversed by 180°. For example, referring to FIG. 1, there is illustrated a portion of a NTSC CVBS signal including a few lines and a few fields of the signal. One can see that between field D and field E of the first frame 0, the chroma component is reversed in phase by 180°. In addition, as between field D in the first frame and field G in the second frame, for the same line, the chroma component is reversed by 180°. Accordingly, when adding the signals between these fields, the chroma signal is canceled out and the luma signal is provided, and when subtracting the signals between these fields of lines, the luma information is canceled out and the chroma signal is provided.

For line combing, one, two or three lines can be used and the corresponding fields can be added and subtracted to obtain the luma and chroma signals. A three-line adaptive comb filter is often referred to a 2D adaptive comb filter. However, line combing methods, although producing better results than the notch/bandpass filters, still show cross/color vertical resolution crawls and dot crawls, for example, when a single line color is present.

Frame combing is similar to line combing, but instead of comparing two adjacent lines within the single frame, two fields with the same line position within two adjacent frames are used for the combing, which results in a comb filtering process that is a temporal domain comb filter. However, frame combing can only be performed for still portions of a CVBS image. If motion is present, then the 2D adaptive comb filter is used.

Referring to FIG. 2, there is illustrated one embodiment of a luma and chroma separator for separating the luma and chroma components of a CVBS signal. The separator 100 includes a 2D comb filter 102, a temporal comb filter 104, a motion detector 106, and a blender 108. The separator can be used to perform motion/adaptive decoding also known as 3D adaptive decoding. As can be seen from FIG. 2, the CVBS is provided to the 2D comb filter, the temporal comb filter and the motion detector. The 2D comb filter outputs a separated luma and chroma signal as described above to the blender 108. The temporal comb filter provides a separated luma and chroma signal across a frame as described above to the blender. The motion detector determines whether motion is present in the CVBS signal and provides a motion decision on line 107 to the blender. If the motion detector determines that motion is present in the CVBS, the blender blends the 2D comb filtered signal and provides the separated luma signal on line 109 and chroma signal on line 111 to the demodulator 110. The demodulator 110 demodulates the high frequency chroma signal on line 111 to a baseband chroma signal.

Alternatively, if the motion detector determines that there is no motion between the frames of the CVBS, then the 3D signal is blended by the blender 108 and provided at outputs 109 and 111.

Thus, referring now to FIG. 3, there is illustrated a process 300 of 3D adaptive decoding that can be accomplished with the separator of FIG. 2. The separator 100 (see FIG. 2) receives the CVBS signal at 302, the motion detector 106 (see FIG. 2) performs a motion detection at 304 according to detection processes known in the art, e.g. a luma motion detection. If motion is detected at 306 Yes, the blender 108 (see FIG. 2) selects the output of the 2D comb filter 102 and if motion is not detected at 306 No, the output of the 3D comb filter 104 is selected. If no motion is present, then the output of the 3D comb filter output signal is applied at 310, and if motion is present, the output of the 2D comb filter is applied at 308.

However, there is a need to more accurately detect whether there is true motion in the CVBS signal. In addition, there is a need for a low cost motion detector that will allow for converting DTV signals to analog signals for continued use of analog television sets after the conversion to a DTV signal format.

SUMMARY OF INVENTION

According to some embodiments of the invention, a method of blending a video signal responsive to a chroma motion result includes determining whether any chroma motion exists within the video signal and providing the chroma motion result. The method also includes providing a first blending signal based on the chroma motion result, providing a second blending signal based on the chroma motion result, modulating temporal filtered luma and chroma components of the video signal with the first blending signal to provide modulated temporal luma and chroma signals, modulating spatial filtered luma and chroma components of the video signal with the second blending signal to provide modulated spatial luma and chroma signals, and adding the modulated temporal luma and chroma signals to the modulated spatial luma and chroma signals to provide a blended video signal.

According to some embodiments of the invention, the method may also include, if chroma motion exists, blending only the spatial filtered chroma and luma signals. If chroma motion does not exist, blending a combination of the spatial filtered and the temporal filtered chroma and luma signals. If chroma motion exists, setting the first blending signal to zero. If chroma motion does not exist, setting the first blending signal to a luma motion result. Determining a difference between a maximum value and the first blending signal to provide the second blending signal.

According to some embodiments of the invention, the method may also include determining whether there is chroma between a first field of the video signal and a second field of the video signal; determining whether there is high frequency energy within the first and second fields; and determining whether there is temporal energy between the first and second fields.

According to some embodiments of the invention, the method may also include comparing high frequency data of adjacent lines within a first field of the video signal to determine whether high frequency luma energy exists within the first field; comparing high frequency data of adjacent lines within a second field of the video signal to determine whether high frequency luma energy exists within the second field; comparing high frequency data between the first field and the second field to determine whether temporal energy exists between the first and second fields comparing data between the first field and the second field of the video signal to determine whether chroma exists between the first and second fields; and providing the chroma motion result based upon the acts of comparing.

According to some embodiments of the invention, the method may also include determining whether a chroma motion signal is above a threshold value.

According to some embodiments of the invention, the method may also include determining which of a first average high frequency signal and a second average high frequency signal is lower, and providing the lower signal as an average high frequency signal. Determining whether the average high frequency signal is less than a threshold value.

According to some embodiments of the invention, the method may also include adding a first average temporal energy signal and a second average temporal energy signal to provide a total average temporal energy signal, and determining if the total average temporal energy signal is greater than a threshold value.

According to some embodiments of the invention, the method may also include determining that chroma motion exists if each of these conditions is true; and determining that chroma motion does not exist if any of these conditions is not true.

According to some embodiments of the invention, a blender that blends a video signal responsive to a chroma motion result includes a motion detector that detects whether any chroma motion exists within the video signal and provides the chroma motion result. The blender may also include a selector, responsive to the chroma motion result and a luma motion signal, that provides a first blending signal and a second blending signal based on the chroma motion result. The blender may also include a first modulator that receives temporal filtered luma and chroma components of the video signal and the first blending signal and that modulates the temporal filtered luma and chroma components of the video signal with the first blending signal to provide modulated temporal luma and chroma signals. The blender may also include a second modulator that receives spatial filtered luma and chroma components of the video signal and the second blending signal, that modulates the spatial filtered luma and chroma components of the video signal with the second blending signal to provide modulated spatial luma and chroma signals. The blender may also include and a first summing device that adds the modulated temporal luma and chroma signals to the modulated spatial luma and chroma signals to provide a blended video signal.

According to some embodiments of the invention, the blender blends only the spatial filtered chroma and luma signals. If chroma motion does not exist, the blender blends a combination of the spatial filtered and the temporal filtered chroma and luma signals. If chroma motion exists, the selector sets the first blending signal to zero. If chroma motion does not exist, the selector sets the first blending signal to a luma motion result. According to some embodiments of the invention, a complement device determines a difference between a maximum value and the first blending signal to provide the second blending signal.

According to some embodiments of the invention, the motion detector determines whether there is any chroma motion within the video signal by determining whether there is chroma between a first field of the video signal and a second field of the video signal, determining whether there is high frequency luma component energy within the first and second fields, and determining whether there is temporal energy between the first and second fields.

According to some embodiments of the invention, the motion detector comprises a comparator that is configured to compare high frequency data of adjacent lines within a first field of the video signal to determine whether high frequency luma energy exists within the first field. The comparator is also configured to compare high frequency data of adjacent lines within a second field of the video signal to determine whether high frequency luma energy exists within the second field. The comparator is also configured to compare high frequency chroma data between the first field and the second field of the video signal to determine whether temporal energy exists between the first and second fields. The comparator is also configured to compare data between the first field and the second field of the video signal to determine whether chroma exists between the first and second fields.

According to some embodiments of the invention, the motion detector determines whether a chroma signal is above a threshold value.

According to some embodiments of the invention, the motion detector determines which of a first average high frequency signal and a second average high frequency signal is lower, and provides the lower signal as an average high frequency signal, and determines whether the average high frequency signal is less than a threshold value.

According to some embodiments of the invention, the motion detector further comprises a summing device that adds a first average temporal energy signal and a second average temporal energy signal to provide a total average temporal energy signal and the comparator determines if the total average temporal energy signal is greater than a threshold value.

According to some embodiments of the invention, the motion detector determines that chroma motion exists if each of these conditions is true; and that chroma motion does not exist if any of these conditions is not true.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
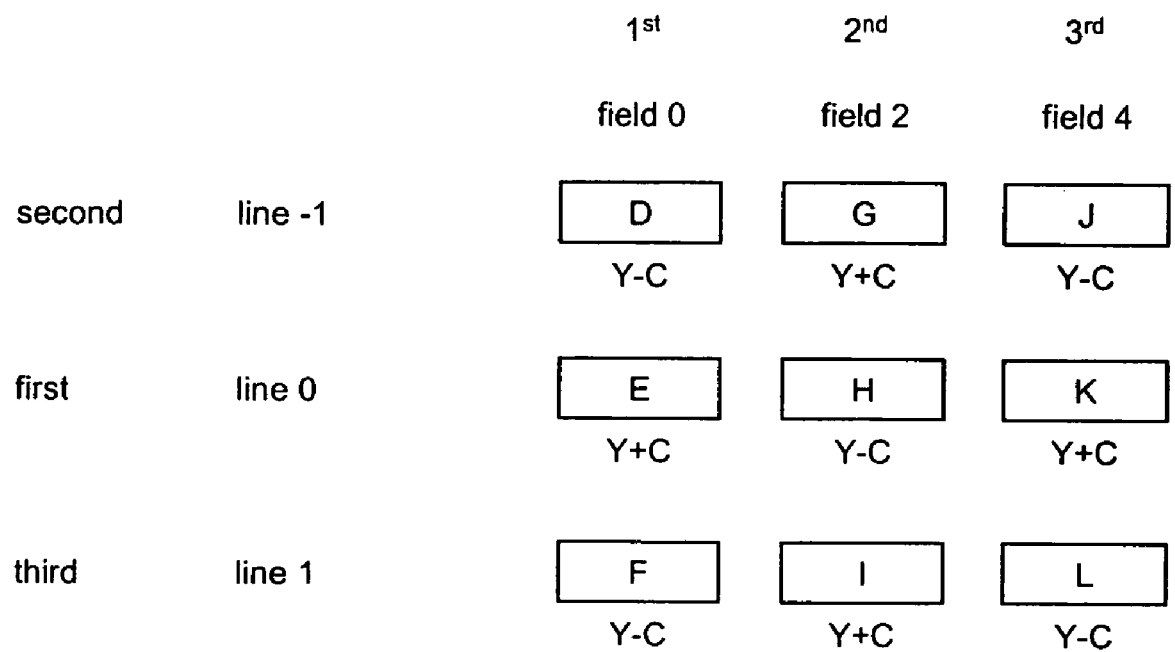
FIG. 1 illustrates exemplary lines and fields of a NTSC CVBS signal.

Various embodiments and aspects of the invention will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "data" refers to physical signals that indicate or include information. The term "data" includes data existing in any physical form, and includes data that are transitory or are being stored or transmitted. For example, data may exist as electromagnetic or other transmitted signals or as signals stored in electronic, magnetic, or other form.

As used herein, the term Component Video Baseband Signal (CVBS) refers to a composite video signal which has luma and chroma components, according to any format used in the industry.

As used herein, the term separator refers to a device or a process for separating components of a signal, for example, luma and chroma components of a CVBS signal.

As used herein, the term motion detector refers to a device or a process for detecting motion across fields or frames of a CVBS signal, for example, luma and/or chroma motion.

As used herein, the term NTSC refers to a standard format for a television signal transmission, as known in the art.

As used herein, the term PAL refers to a standard format for a television signal transmission, as known in the art.

As used herein, a "memory" is a physical medium that can store data. Examples of memories include magnetic media such as diskettes, floppy disks, and tape; optical media such Magneto-Optic disks, CDs, and DVDs; and semiconductor media such as semiconductor ROMs, RAMs, etc.

In broad overview, various embodiments of the present invention permit the processing of a Composite Video Base Band Signal (CVBS) to provide reliable motion detection in order to accurately separate chroma and luma components of the CVBS signal. In particular, embodiments of the present invention provide for reliable motion detection by processing pixels across two fields or frames of the CVBS signal and spatial activities within at least one field of the CVBS signal to determine whether chroma motion exists. More specifically, with one embodiment of the invention data from adjacent lines in a first field and data from adjacent lines in a second field of the CVBS signal are operated on to determine whether any high frequency luma component of the CVBS signal exists within the first field and the second field. In addition, data from the first field and from the second field of the CVBS signal are processed to determine whether there is any temporal energy between the first and second fields. In addition, data from the first field and the second field of the CVBS signal are processed to determine whether chroma exists between the first and second fields. Based on these results, a chroma motion result is determined and the chroma motion result is used in the blending of filtered chroma and luma components of the CVBS signal.

According to some embodiments, the high frequency luma signal within the first and second fields of the CVBS signal, and the temporal energy signal across the first and second fields are averaged across number of pixels to provide average high frequency energy signals and average temporal energy signals with reduced noise. Further, according to some embodiments, if the average high frequency luma signal is less than the threshold value, the average temporal energy signal is greater than a threshold value, and the chroma signal between the first and second fields is above a threshold value, then the motion detection process and apparatus of the invention determines that chroma motion exists. Otherwise, the chroma motion detection process and apparatus determines that chroma motion does not exist.

Figure 2:
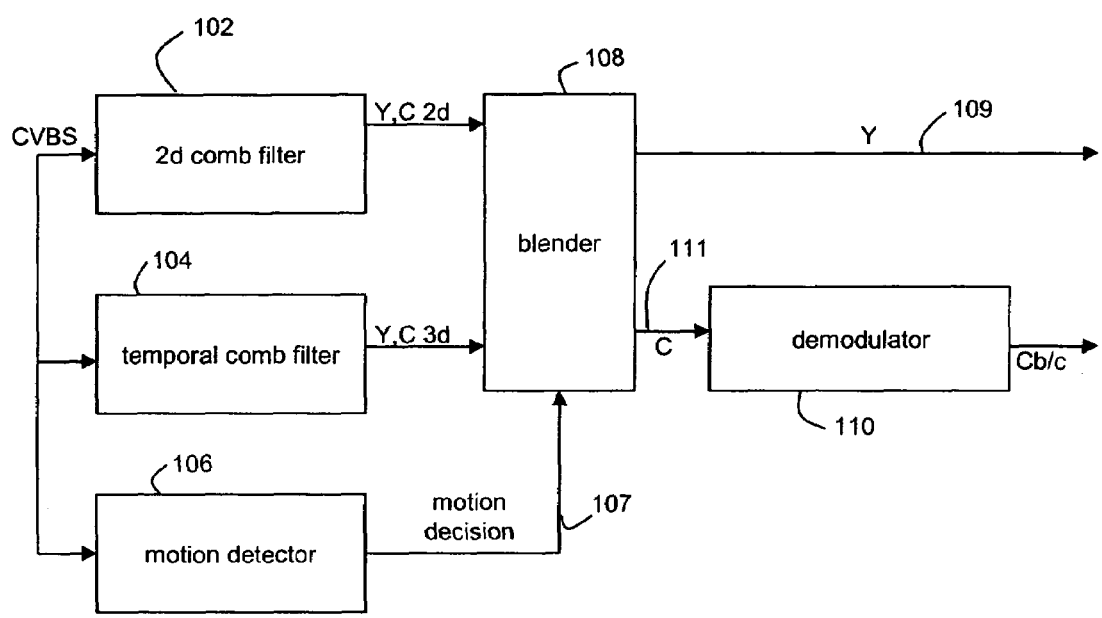
FIG. 2 illustrates a schematic block diagram of a luma and chroma separator that can be used with the invention.
Figure 3:
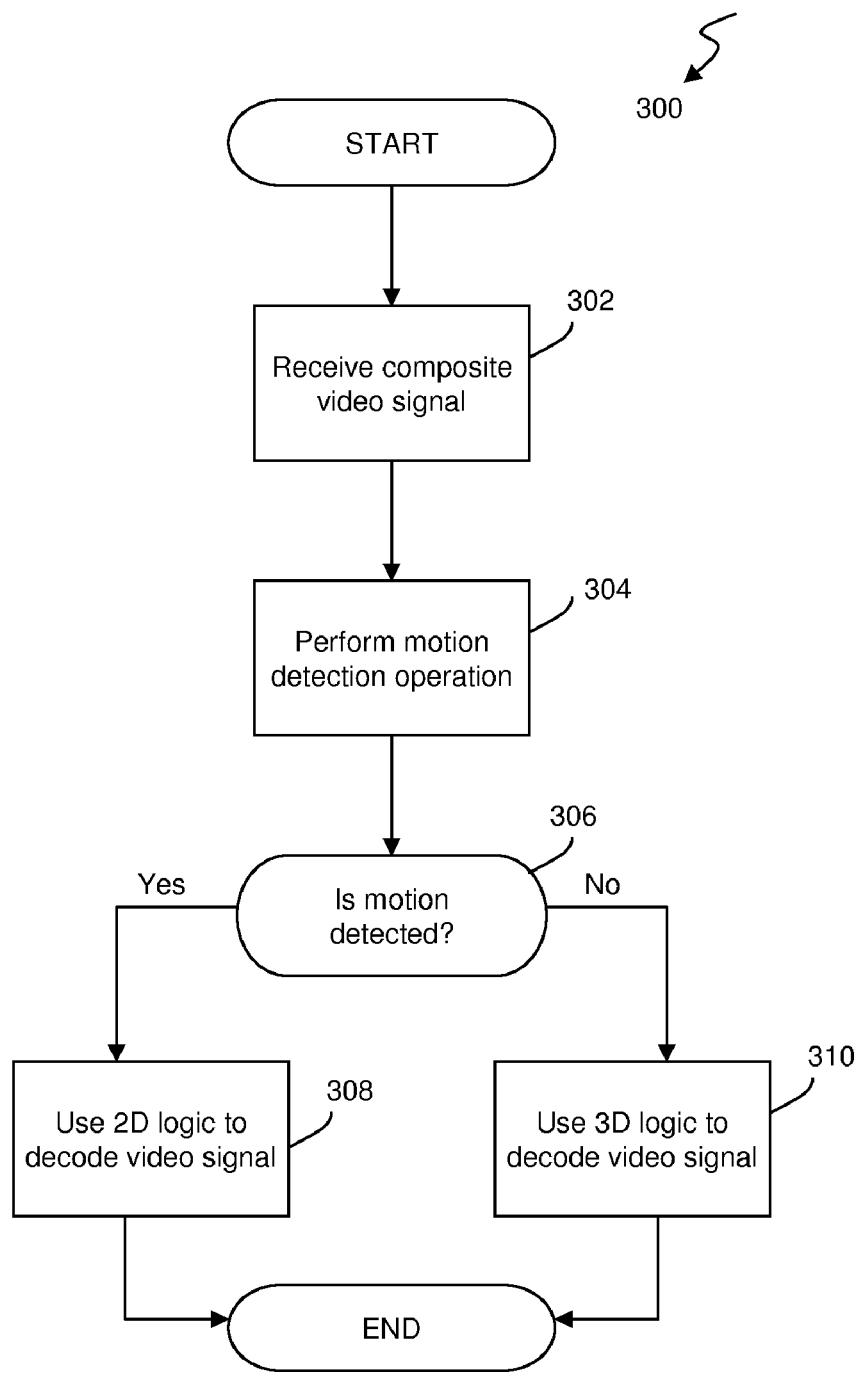
FIG. 3 illustrates a high-level flow chart of an embodiment of a process performed by a CVBS decoder as is known in the art.
Figure 4:
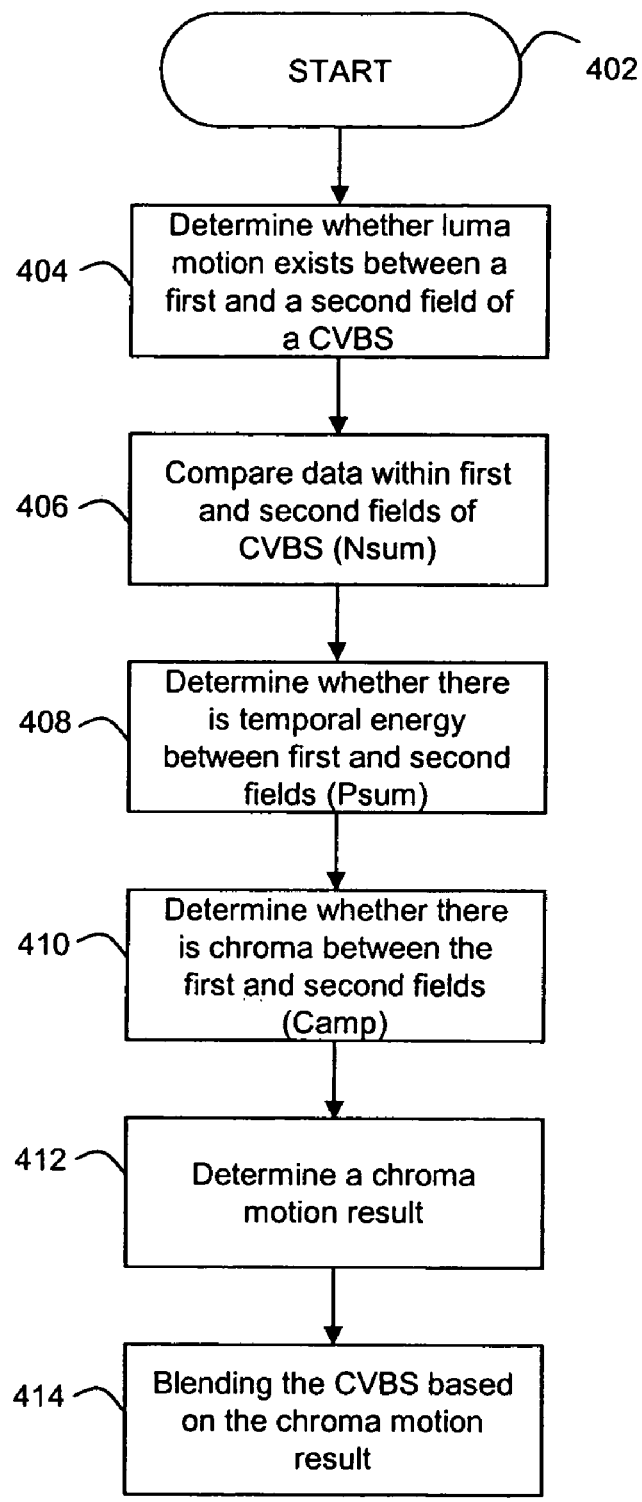
FIG. 4 is a flow chart of an embodiment of a process for determining motion within a CVBS signal according to the invention.

Referring now to FIG. 4, there is illustrated a high-level flow chart of one embodiment of motion detection operation 400 of the invention, for example, that the motion detector 106 of FIG. 2 can be configured to perform. As can be seen in FIG. 2, the motion detector 106 receives the CVBS signal and operates on the CVBS signal to determine whether there is motion in the signal. For the following description of the various embodiment of the motion detector 106 and the motion detection process of the invention as well as the blending process and blender 108 of the invention, reference will continually be made to FIG. 1 which illustrates a number of lines and a number of frames of the NTSC CVBS signal. It should be appreciated that the following discussion will be properly focused on NTSC signals, but it is equally applicable to PAL signals and generally to CVBS signals.

Referring to FIG. 4, one embodiment of the motion detection process begins at 402 and includes determining whether luma motion exists between a first field of the CVBS (field 0 of FIG. 1) and a second field (field 2) of the CVBS signal. The motion detection process also includes at 406 comparing data from a number of lines (line −1, line 0, line 1) within the first field (field 0) and comparing data from a number of lines (line −1, line 0, line 1) within the second field (field 2) of the CVBS signal to determine if a high frequency luma component exists within the first and second fields. In addition, the motion detection process includes at 408 determining whether there is any temporal energy between the first and second fields of the CVBS signal. The motion detection process also includes determining at 410 whether there is chroma between the first and second fields of the CVBS signal. The motion detection processes the results of acts 406, 408, and 410 to determine whether there is chroma motion (act 412) on a per pixel basis in the CVBS signal and to provide a chroma motion result on line 107 (see FIG. 1) to the blender 108. As will also be described herein, the CVBS blending or filtering process may also comprise the blender 108 blending the filtered chroma and luma components of the CVBS signal (act 414), for example, as provided at the output by the 2D comb filter 102 and as provided at the output of the temporal comb filter 104 to the blender 108, based on the chroma motion result provided on line 107 from the motion detector 106.

Figure 5:
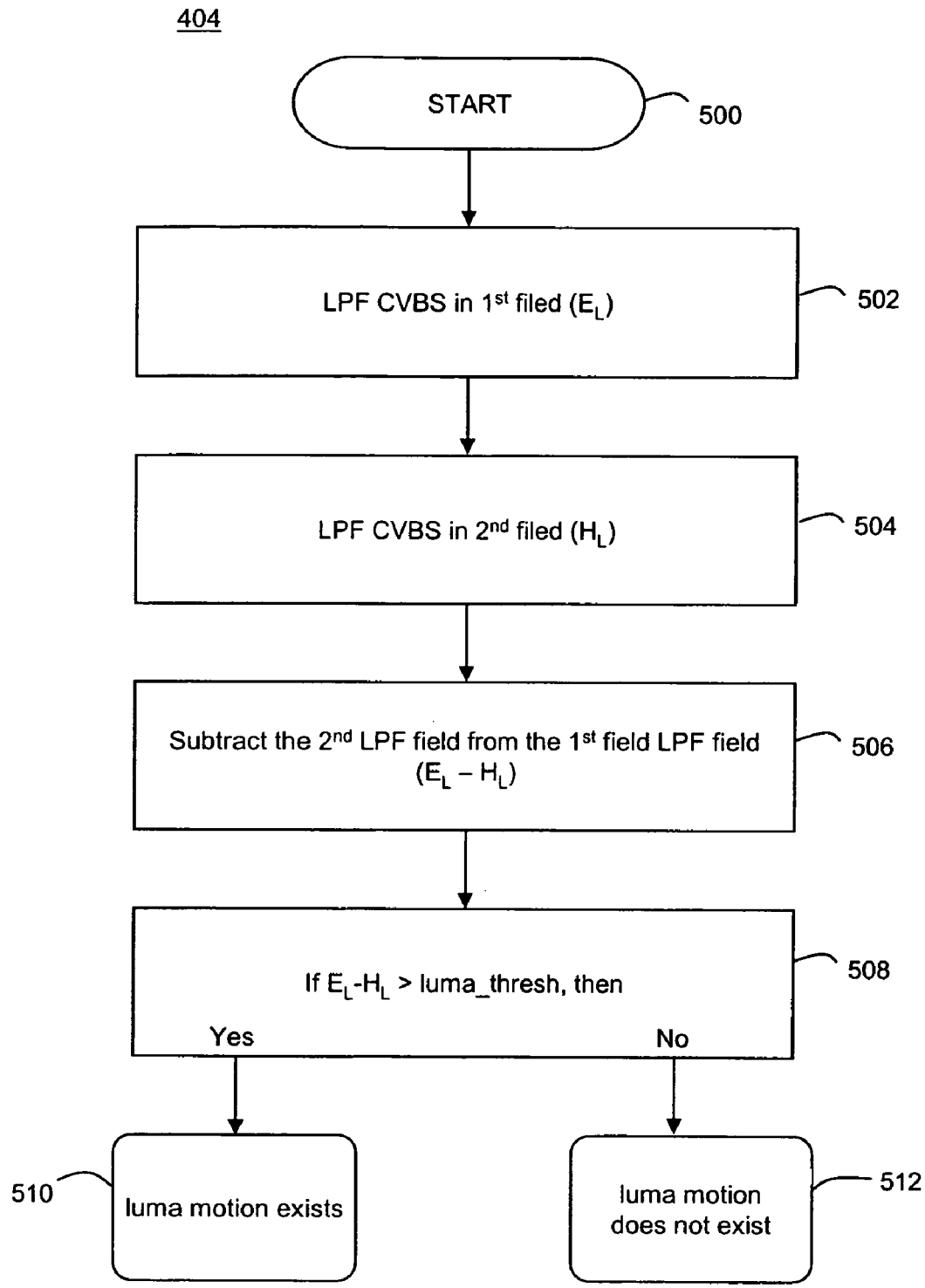
FIG. 5 is a flow chart of an embodiment of a process for determining luma motion within the CVBS signal according to the invention.

Referring now to FIG. 5, there is illustrated a flow chart of one embodiment of the process 404 for determining whether luma motion exists within the CVBS signal, in particular, between the first field and the second field. Since the chroma component of the CVBS signal is in the high frequency band, the chroma component can be removed by low pass filtering the CVBS signal to provide the luma component of the signal. Referring to FIG. 2, determining whether luma motion exists between field 0 and field 2 begins at act 500 and includes low pass filtering the CVBS data in a first line (line 0) of the first field (field 0) to provide a first low pass filter signal $E_L$ at act 502. In addition, the process includes low pass filtering the CVBS signal in the first line (line 0) of the second field (field 2) to provide a second low pass filtered signal $H_L$ at act 504. The process further comprises subtracting the second low pass filtered signal from the first low pass filtered signal $(E_L - H_L)$ (act 506) to provide a luma motion signal. In addition, the process includes determining at 508 whether the luma motion signal is greater than a threshold value, for example retrieved from memory, and if the luma motion signal is greater than the luma threshold value (luma_thresh), the process determines at 510 that luma motion exists. In contrast, if the luma motion signal $(E_L - H_L)$ is not greater than the luma threshold value (luma_thresh), the process determines at 512 that luma motion between the first field and the second field does not exist.

Figure 6:
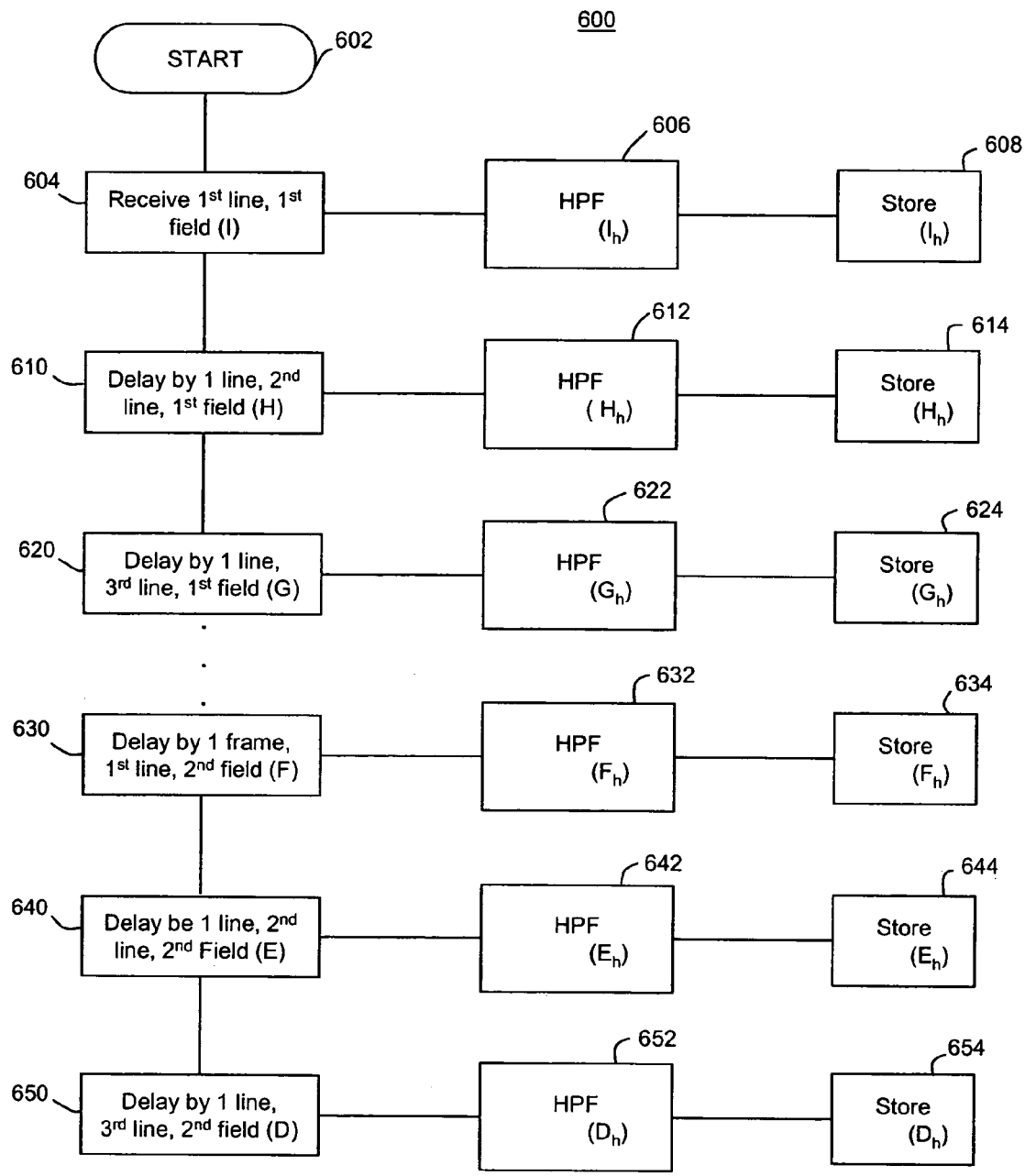
FIG. 6 is a flow chart of an embodiment of a process for high pass filtering lines and fields of the CVBS signal according to the invention.

According to various embodiments of the invention, the process 400 of determining whether chroma motion exists comprises determining whether there is a high frequency luma component within the first field (field 0) of the CVBS signal, whether there is a high frequency luma component within the second field (field 2) of the CVBS signal, whether temporal energy exists between the first and second fields of the CVBS signal, and whether chroma exists between the first and second fields. To determine whether chroma motion exists, the CVBS signal is high pass filtered to provide the chroma component of the CVBS signal as well as the high frequency component of the luma component of the CVBS signal. Referring now to FIG. 6, there is illustrated one aspect of the motion detection process and apparatus, which comprises high pass filtering the CVBS signal. In particular, according to one embodiment, the act of high pass filtering the CVBS begins at 602 and includes receiving the data from a first field I (field 2, line 1) at 604, high pass filtering the data at 606 to provide a first high pass filtered signal (Ih), and storing the first high pass filtered signal at 608. In addition, the process comprises delaying the received CVBS data by one line to provide the data in a second line (line 0) of field 2 at 610, high pass filtering the data in the second line to provide a second high pass filtered signal (Hh) at 612, and storing the second high pass filtered signal at 614. The process also includes delaying the CVBS data by one line to provide data in a third line (line −1) of field 2 at 620, high pass filtering the data in the third line to provide a third high pass filtered signal (Gh) at 622, and storing the third high pass filtered signal data at 624. It is to be appreciated that this process can be continued for a number of lines within a field of the CVBS signal and that by delaying the signal for a number of lines of the field or frame, the pixel data in the next field (field 0) can be operated on. Accordingly, the process also comprises delaying the CVBS data so as to operate on the first line (line 1) of the second field (field 0) at 630, high pass filtering the pixel data (F) at 632 to provide a fourth high pass filtered signal (Fh), and storing the fourth high pass filtered pixel data at 634. In addition, the process further comprises delaying the CVBS data by one line so as to act on the second line (line 0) of the second field (field 0) at 640, high pass filtering the data (E) to provide a fifth high pass filtered signal (Eh) at 642, and storing the fifth high pass filtered signal at 644. In addition, the process comprises delaying the CVBS data by one line so as to act on the third line (line −1) of the second field (field 0) at 650, high pass filtering the data (D) to provide a sixth high pass filtered signal (Dh) at 652, and storing the sixth high pass filtered signal at 654.

Figure 7:
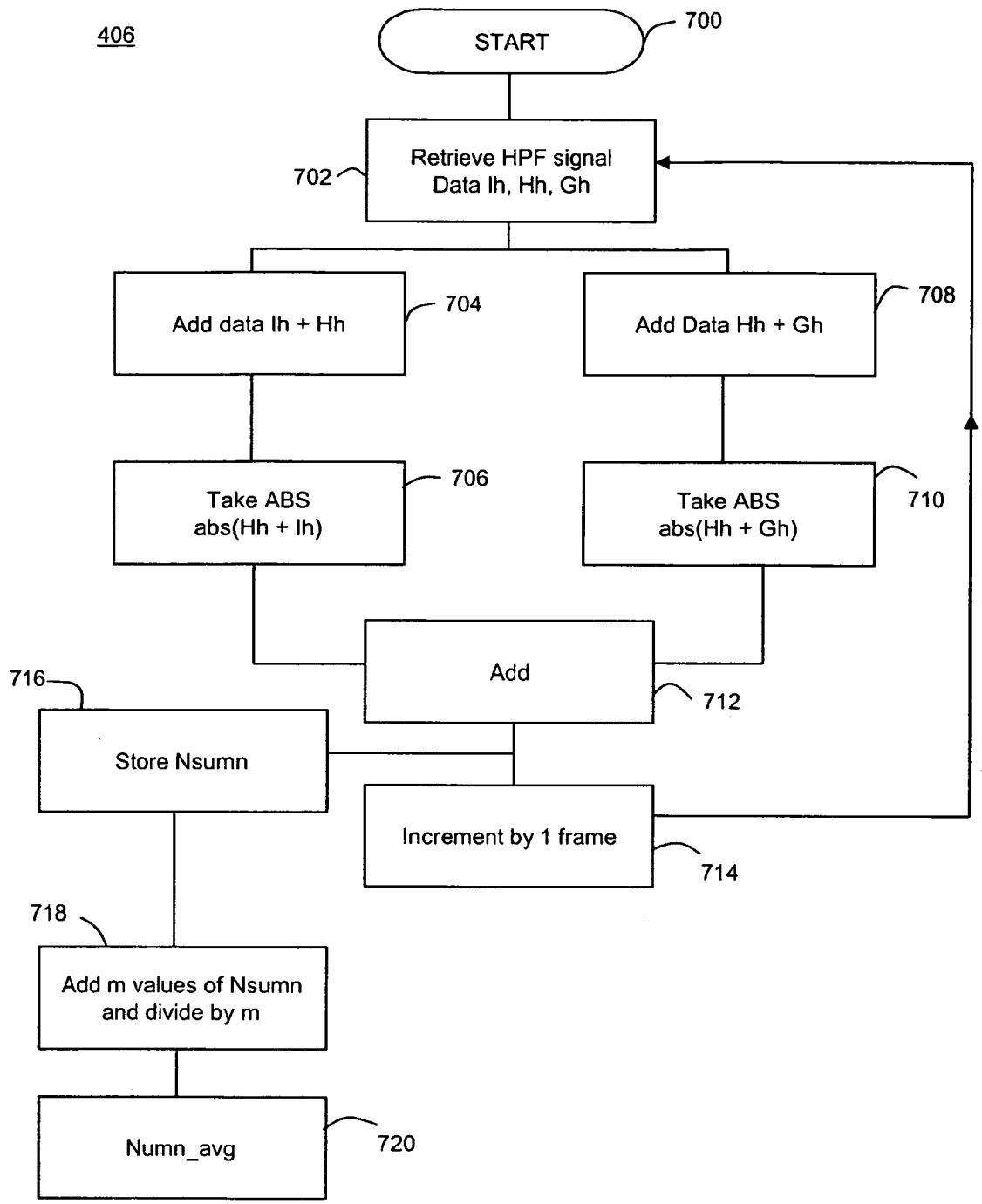
FIG. 7 is a flow chart of an embodiment of a process for determining whether a high frequency luma component exists within fields of the CVBS signal according to the invention.

Referring now to FIG. 7, there is illustrated one embodiment of a process 406 for comparing high frequency data within the first and second fields of the CVBS signal. The process begins at 700 and includes retrieving the high pass filtered pixel data signals from a number of lines (line 1, line 0, line −1) of the first field (field 2) at 702. The first high pass filtered signal data (Ih) is added to the second high pass filtered signal data (Hh) at 704 to provide a first summed signal, and an absolute value of the first summed signal is determined at 706 to provide a first absolute value signal, which is the absolute value (abs) of (Hh+Ih). In addition, the high frequency data of the second high pass filtered signal (Hh) is added to the high frequency data for the third high pass filtered signal (Gh) to provide a second summed signal (Hh+Gh) at 708, and an absolute value of the second summed signal is determined at 710 to provide a second absolute signal, which is the absolute value (abs) of (Hh+Gh). The first absolute value signal abs (Hh+Ih) is added to the second absolute value signal abs (Hh+Gh) at 712 to provide a first high frequency energy signal (Nsum2) for the first field of the CVBS signal. The first high frequency signal is stored at act 716. In addition, the field or frame of the CVBS is incremented by one at 714 to operate on the next field (field 0) of the CVBS signal, and the above-described process 406 is repeated to provide a second high frequency energy signal (Nsum1) for the second field (field 0) of the CVBS signal. Accordingly, one embodiment of the act of determining chroma motion within the CVBS signal comprises determining the high energy frequency signals (Nsum) within the first and second fields of the CVBS, as illustrated in FIG. 7. According to some embodiments, the high frequency energy signals can be added up over a number of pixel windows and divided by the number of pixel windows at 718 to provide an average of the high frequency signal within each field over a number of pixel windows (Nsum1_avg; Nsum2_avg), for example over five pixel windows, at 720.

Figure 8:
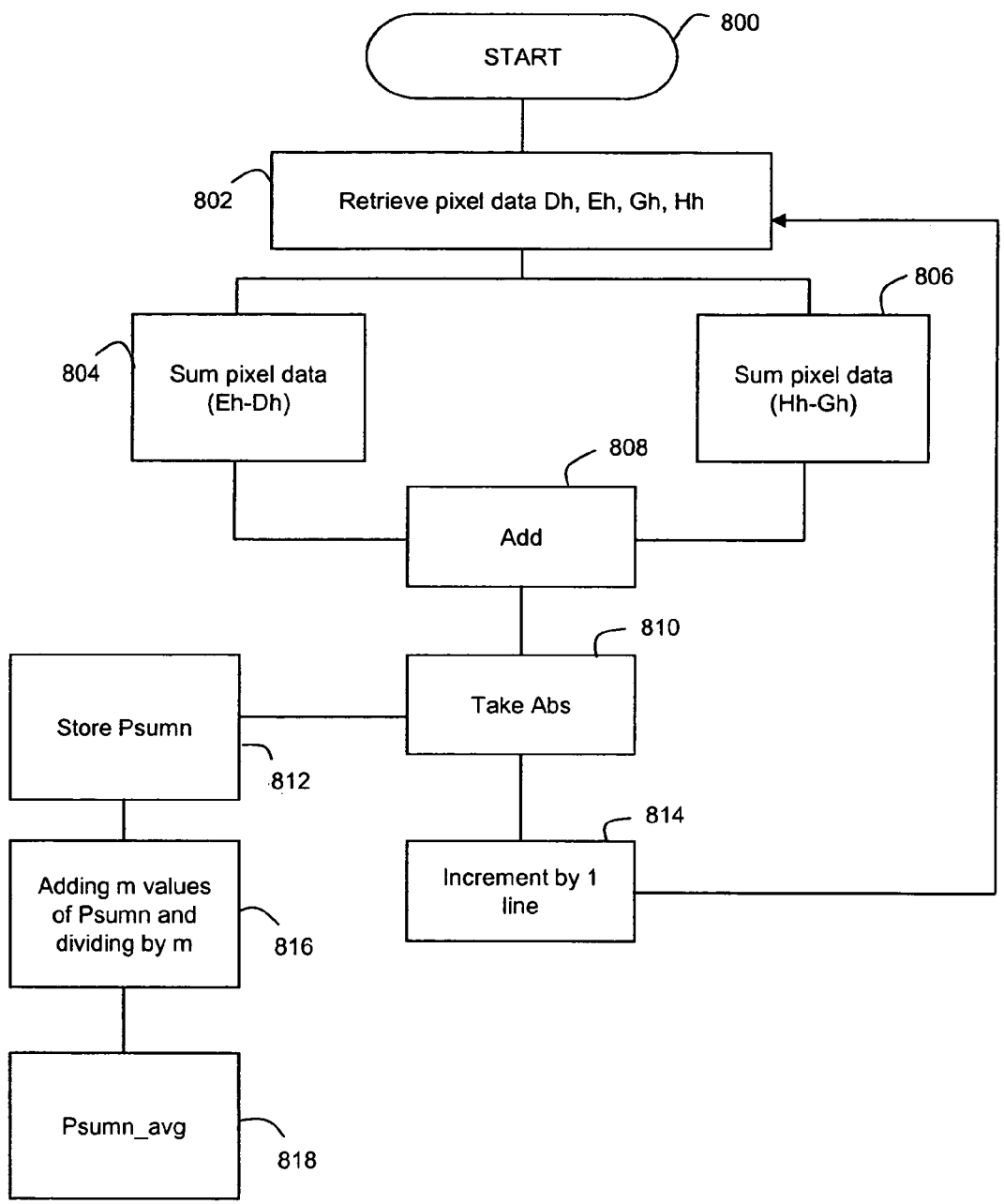
FIG. 8 is a flow chart of an embodiment of a process for determining whether there is temporal energy between fields of the CVBS signal according to the invention.

Referring now to FIG. 8, there is illustrated one embodiment of a process 408 for determining whether there is temporal energy between the first and second fields of the CVBS signal. The process 408 begins at 800 and includes retrieving the high frequency data signals (Dh, Gh) for a first line (line −1) of the first and second fields (field 0, field 2) of the CVBS signal and retrieving the high frequency data (Eh, Hh) for a second line (line 0) of the first and second fields at 802. The process also includes subtracting the high frequency data for the first line (line −1) of the first field (field 0) Dh from the high frequency data for the second line (line 0) of the first field (Eh) to provide a first difference signal (Eh−Dh) at 804. In addition, the process includes subtracting the high frequency data for the first line (line −1) in the second field (field 2) Gh from the high frequency data in the second line of the second field (Hh) to provide a second difference signal (Hh−Gh) at 806. The first difference signal (Eh−Dh) is added to the second difference signal (Hh−Gh) to provide a summed signal at 808, and an absolute value (abs) of the summed signal is determined at 810 to provide a first temporal energy signal (Psum1), which comprises the absolute value of the first difference signal plus the second difference signal (Psum1=abs(Eh−Dh+H−Gh)). The first temporal energy signal can be stored at 812. In addition, the line can be incremented by one at 814 and the process 408 is repeated to provide a second temporal energy signal (Psum2) for the high frequency signals in the second (line 0) and third (line 1) of the first and second fields, in particular, Psum2=abs(Eh−Fh+Hh−Ih). According to some embodiments of the process 408, the temporal energy signals (Psum1, Psum2) can be added over a number of pixel windows and divided by the number of pixel windows at 816, to provide average temporal energy signals (Psum1_avg; Psum2_avg) over a number of pixels windows at 818.

Figure 9:
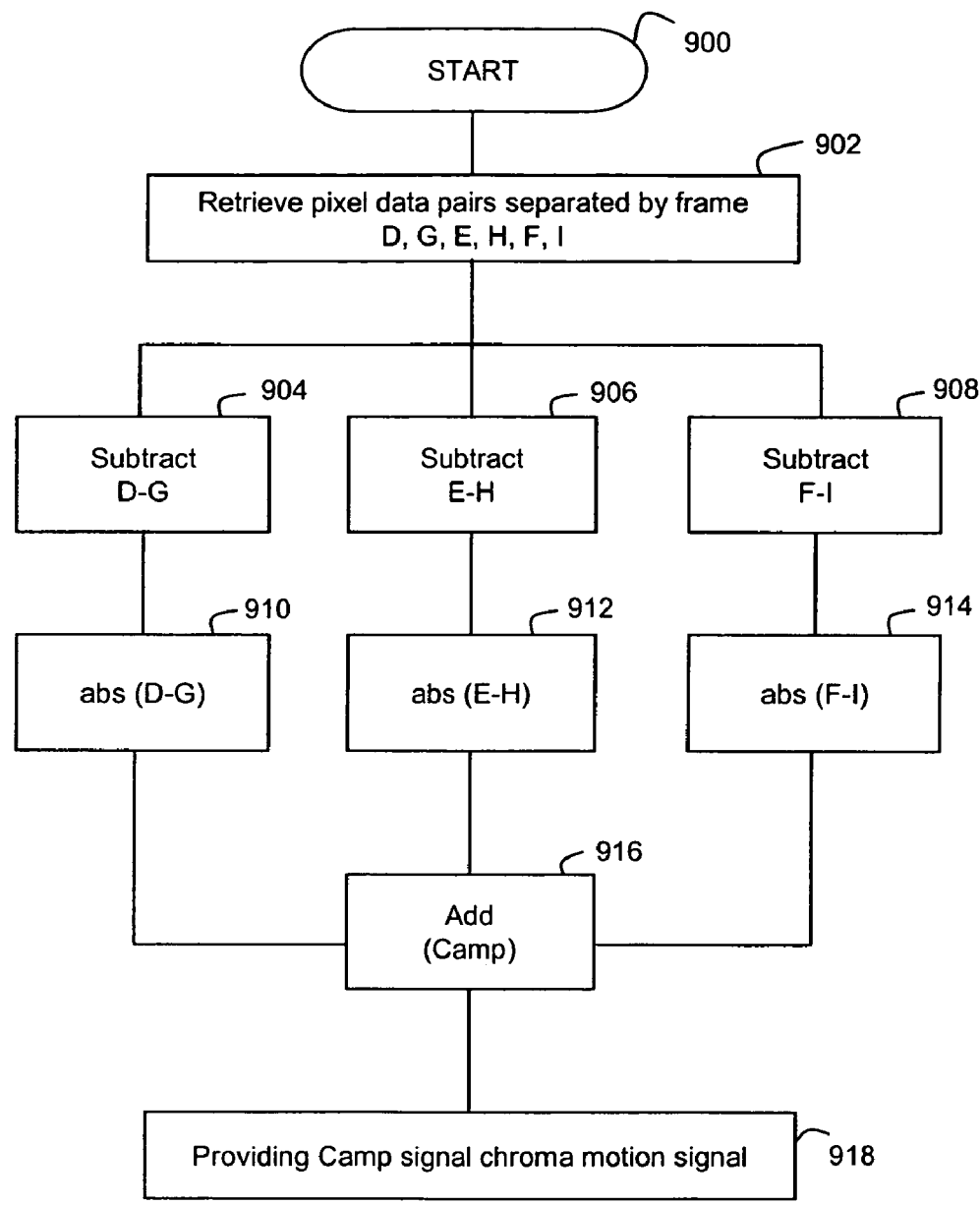
FIG. 9 is a flow chart of an embodiment of a process for determining whether there is chroma between fields of the CVBS signal.

Referring now to FIG. 9 there is illustrated one embodiment of the process 410 for determining whether there is chroma between the first and second fields of the CVBS signal. In particular, the process begins at 900 and includes retrieving data (D, G), for the first line (line −1) in the first and second fields (field 0, field 2), retrieving data (E, H), for the second line (line 0) in the first and second fields, and retrieving data (F, I), for the third line (line 1) in the first and second fields at 902. A first inter-field chroma signal is determined at 904 by subtracting the video signal for the first line in the second field from the video signal for the first line in the first field (D−G). A second inter-field chroma signal is determined at 906 by subtracting the video signal for the second line in the second field (H) from the video signal for the second line in the first field (E) to provide the second inter-field chroma signal (E−H). A third inter-field chroma signal is determined at 908 by subtracting the video signal for the third line in the second field (I) from the video signal for the third line in the first field (F) to provide the third inter-field chroma signal (F−I). A first inter-field absolute value signal is determined at 910 by determining an absolute value of the first inter-field chroma signal (D−G) to provide the first inter-field absolute value signal [abs(D−G)]. A second inter-field absolute value signal is determined at 912 by determining an absolute value of the second inter-field chroma signal (E−H) to provide the second inter-field absolute value signal [abs(E−H)]. A third inter-field absolute value field signal is determined at 914 by determining an absolute value of the third inter-field chroma signal (F−I) to provide the third inter-field absolute value signal [abs(F−I)]. At 916, the first inter-field absolute value signal, the second inter-field absolute value signal and the third inter-field absolute value signal are added (Camp=abs(D−G)+abs(E−H)+abs(F−I)) to provide a chroma signal (Camp) at 918, which is indicative of whether there is chroma between the first and second fields.

Figure 10:
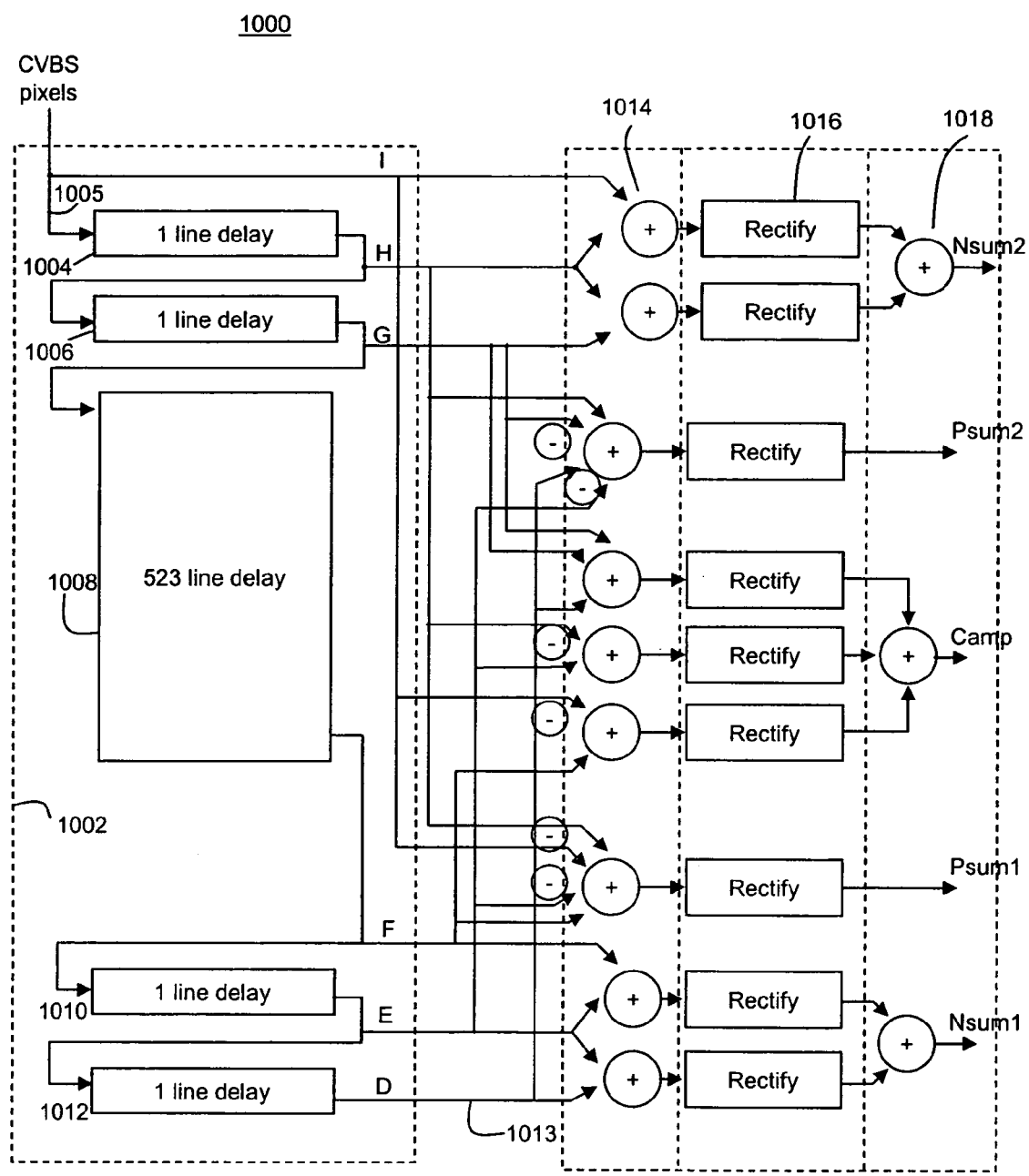
FIG. 10 is a schematic block diagram of an aspect of an embodiment of a motion detector for determining whether there is chroma motion within the CVBS signal according to the invention.

Referring now to FIG. 10, there is illustrated a schematic block diagram of one aspect of one embodiment of a motion detector 1000 for determining whether there is chroma motion within the CVBS signal. In particular, one embodiment of a chroma motion detector comprises a First In, First Out (FIFO) buffer 1002 comprising a plurality of delay lines (1004, 1006, 1008, 1010, 1012), which together comprise a FIFO buffer of one frame length plus 2 lines (527 total lines for NTSC signals). Referring to FIG. 10 in conjunction with the NTSC lines and fields illustrated in FIG. 1, it can be seen that the CVBS pixel data enters the delay line at the top left signal line 1005 and proceeds through the delay line such that the oldest pixel data exits the FIFO buffer at an output 1013 of the bottom-most delay line. In particular, pixel data from the first line (line −1) of the field 0 (D) are emerging from the FIFO buffer 1002 of the bottom-most delay line in FIG. 10 at the same time that pixel data (I) are entering the first delay line 1004 of the FIFO buffer. At the same time, pixel data emerging from the first delay line 1004 (H) correspond to pixel data in the second line (line 0) of field 2, and pixel data (G) emerging from the second delay line 1006 correspond to pixel data in the third line (line −1) of the second field. Thus, as can be see from FIG. 10, the pixel data (D) exiting the line delay element 1012 at the bottom of the FIFO is one frame away from the pixel data (G) exiting the line delay element 1006. Similarly, the pixel data exiting the line delay 1010 (E) are one frame away from the pixel data (H) exiting the line delay element 1004. Similarly, the pixel data exiting the line delay element 1008 (F) is one frame away from the pixel data entering the line delay element 1004 (I). This embodiment of the motion detector 1000 also includes a sum and difference device 1014, a rectifier device 1016, and a summing device 1018. The illustrated phases (signs) applied to the output signals of the FIFO buffer 1002 provide for the summing, rectification and summing of the output signals to determine the previously described values of the high frequency energy signals within the first and second fields (Nsum1, Nsum2), the temporal energy signals between the first and second energy fields (Psum1, Psum2), and the chroma result between the first and second fields (Camp).

Figure 11A:
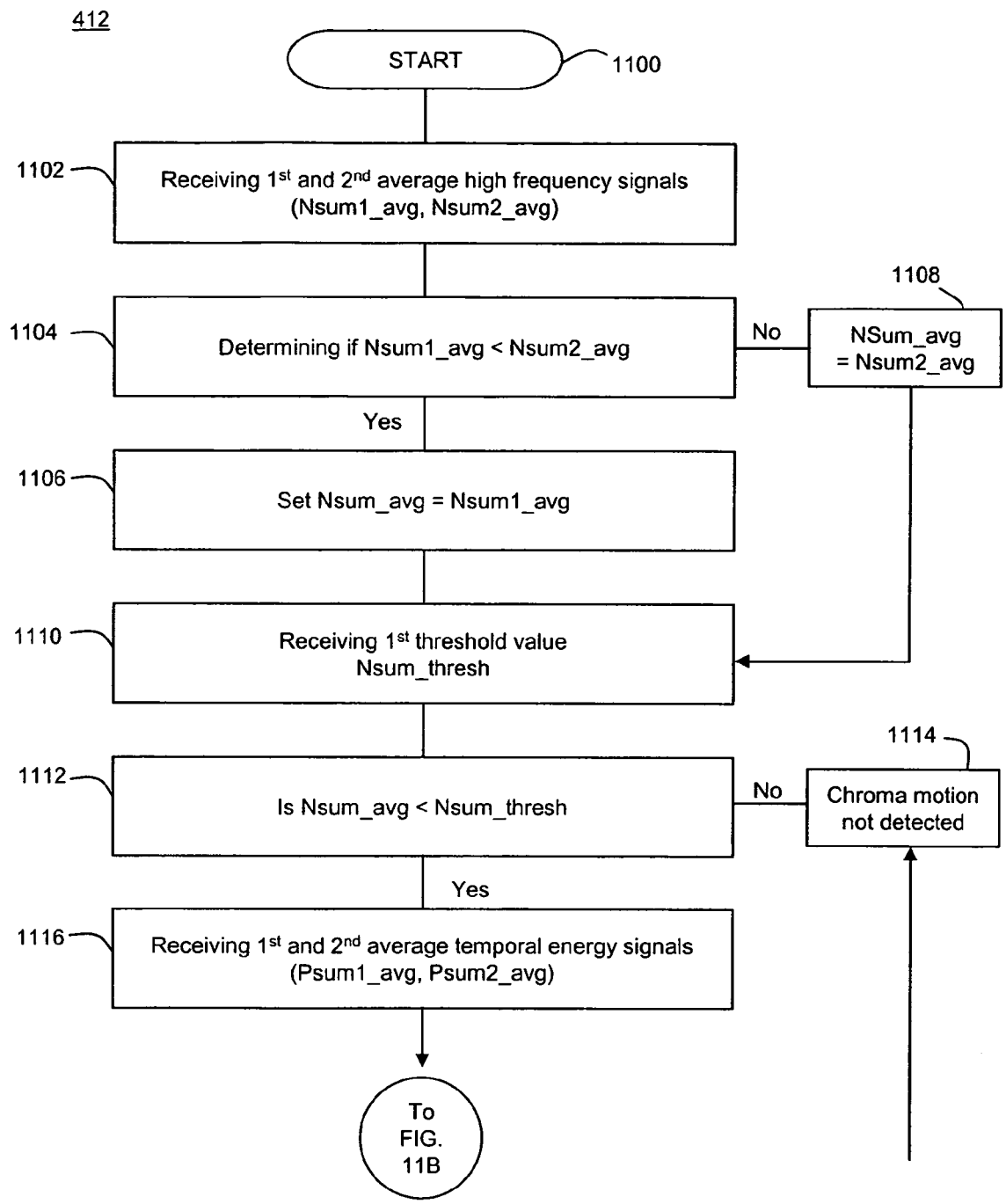
FIG. 11 is a flow chart of an embodiment of the process for determining whether chroma motion exists within the CVBS signal according to the invention.
Figure 11B:
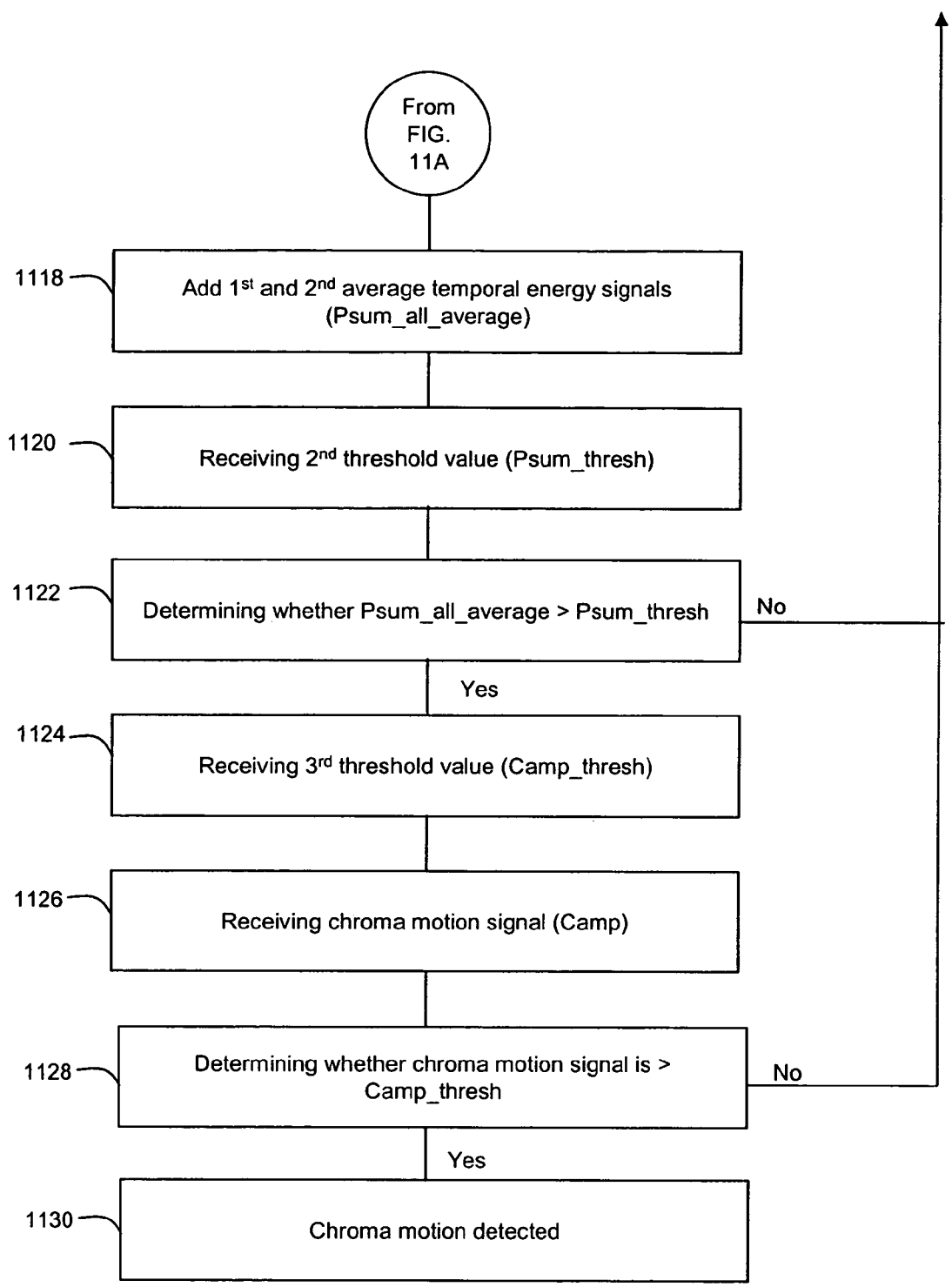

Referring now to FIG. 11, there is illustrated one aspect of one embodiment of the process 412 for determining whether there is a chroma motion within the CVBS signal. The process begins at 1100 and includes receiving the first average high frequency signal (Nsum1_avg) and receiving the second average high frequency signal (Nsum2_avg) at 1102, which have been determined as described herein. The process also includes determining which of the first average high frequency signal for the first field and the second average high frequency signal for the second field is lower, and setting an average high frequency signal value for the first and second fields to the lower of the two average signals. In particular, according to one embodiment, it is determined at 1104 whether the first average high frequency signal (Nsum1_avg) is less than the second average high frequency signal (Nsum2_avg). If the first average high frequency signal is lower than the second average high frequency signal (1104 Yes), then an average high frequency signal value (Nsum_avg) is set to equal the first average high frequency signal value (Nsum1_avg) at 1106. Alternatively, if the second average high frequency signal is lower (1104 No), then the average high frequency signal value (Nsum_avg) is set to equal the second average high frequency signal (Nsum2_avg) at 1108. The process further comprises receiving a first high frequency threshold value (Nsum_thresh) at 1110, and determining whether the average high frequency signal is less than the high frequency threshold value at 1112. If the average high frequency signal (Nsum_avg) is not less than the high frequency threshold value (1112 No), then the process determines that there is a high frequency luma component of the CVBS signal within the first and second fields and that there is no chroma motion in the CVBS signal at act 1114.

Alternatively, if the process 412 determines that the average high frequency signal (Nsum_avg) is less than the high frequency threshold value (act 1112 Yes), the process receives the first average temporal energy signal (Psum1_avg) and the second average temporal energy signal (Psum2_avg) at 1116. The first average temporal energy signal is added to the second average temporal energy signal at 1118 to provide a total average temporal energy signal (Psum_all_avg). In addition, the process receives an average temporal energy threshold value (Psum_thresh) at act 1120, for example, by retrieving the value from memory. The process determines whether the total average temporal energy signal (Psum_all_avg) is greater than the temporal energy threshold value (Psum_thresh) at act 1112. If the total average temporal energy signal is not greater than the temporal energy threshold value (act 1122 No), then the process determines that chroma motion does not exist at act 1114.

However, if the total average temporal energy signal is greater than the temporal energy threshold value (act 1122 Yes), the process receives a chroma threshold value (Camp_thresh) at 1124 and receives the chroma signal (Camp) at 1126, for example, by retrieving these values from memory. In addition, the process determines whether the chroma signal is above the chroma threshold value at 1128. If the chroma signal is not above the chroma threshold value (act 1128 No), then the process determines that chroma motion does not exist at 1114. However, if the process determines that the chroma signal is above the chroma threshold value, then the process determines that chroma motion exists at 1130 and provides the chroma motion result on line 107 (see FIG. 1). It should also be appreciated that the above-described process of determining whether chroma motion exists has been described as occurring within the motion detector 106 (see FIG. 1), but the process can also occur in the blender 108 as part of the process of blending the CVBS signal or can be distributed between these components.

Figure 12:
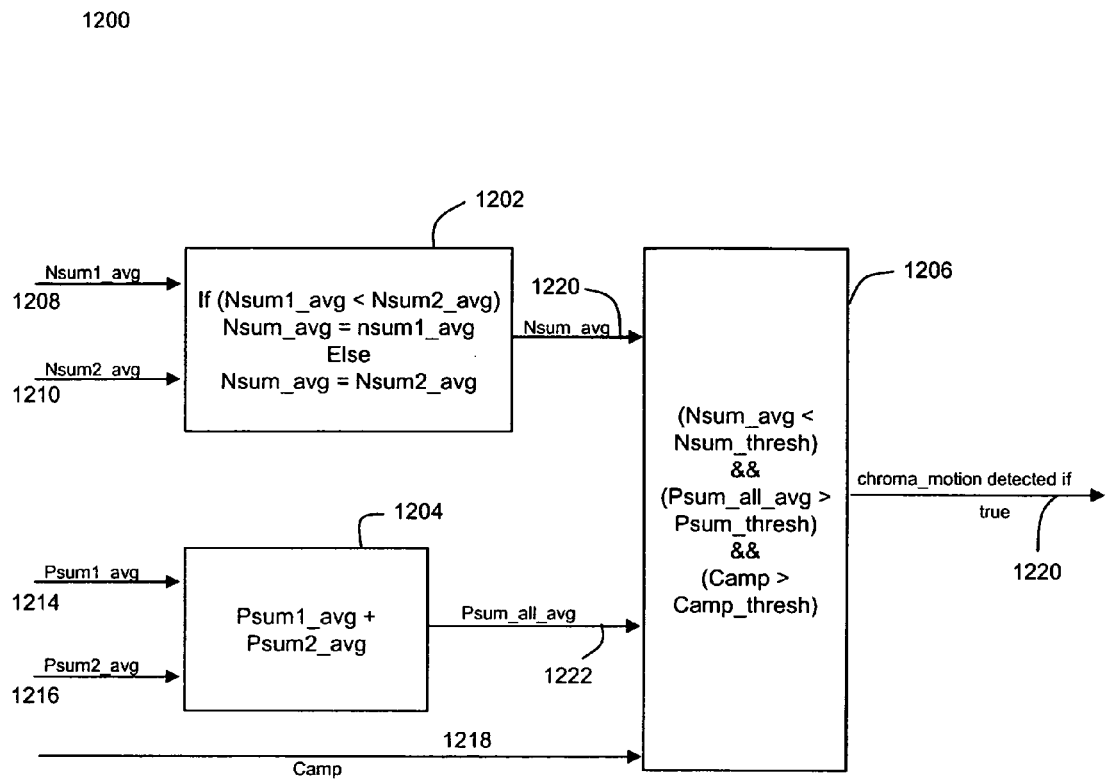
FIG. 12 is a schematic block diagram of an aspect of an embodiment of a detector for determining whether chroma motion exists within the CVBS signal according to the invention.

Referring to FIG. 12, there is illustrated a schematic block diagram of an aspect of one embodiment of a detector device for determining whether chroma motion exists. In particular, the detector device 1200 includes a first comparator device 1202, which receives the first average high frequency signal (Nsum1_avg) on line 1208 and which receives the second average high frequency signal (Nsum2_avg) on line 1210. The comparator device determines which of the first average high frequency signal and the second average high frequency signal is lower in value, sets and average high frequency signal (Nsum_avg) to equal the lower value, as was described above with respect to FIG. 11 and provides the average high frequency signal (Nsum_avg) on line 1220. The motion detector also includes a summing device 1204 that receives the first average temporal energy signal (Psum1_avg) on line 1214 and that receives the second average temporal energy signal (Psum2_avg) on line 1216, and which adds the first and second average temporal energy signals together to provide the total average temporal energy signal (Psum$_{13}$_all_avg) on line 1222. The detector further comprises a comparator 1206 that receives the average high frequency signal (Nsum_avg) on line 1220, the total average temporal energy signal (Psum_all_avg) on line 1222, and the chroma motion signal (Camp) on line 1218. The comparator 1206 determines whether the average high frequency signal (Nsum_avg) is less than the high frequency threshold value (Nsum_thresh), determines whether the total average temporal energy signal (Psum_all_avg) is greater than the temporal energy threshold value (Psum_thresh), and determines whether the chroma signal (Camp) is greater than the chroma threshold value (Camp_thresh). If each of these is true, the resulting signal indicates that chroma motion is detected and otherwise indicates that chroma motion is not detected. The result is output on line 1220, for example, to the blender 108 of FIG. 1.

Figure 13:
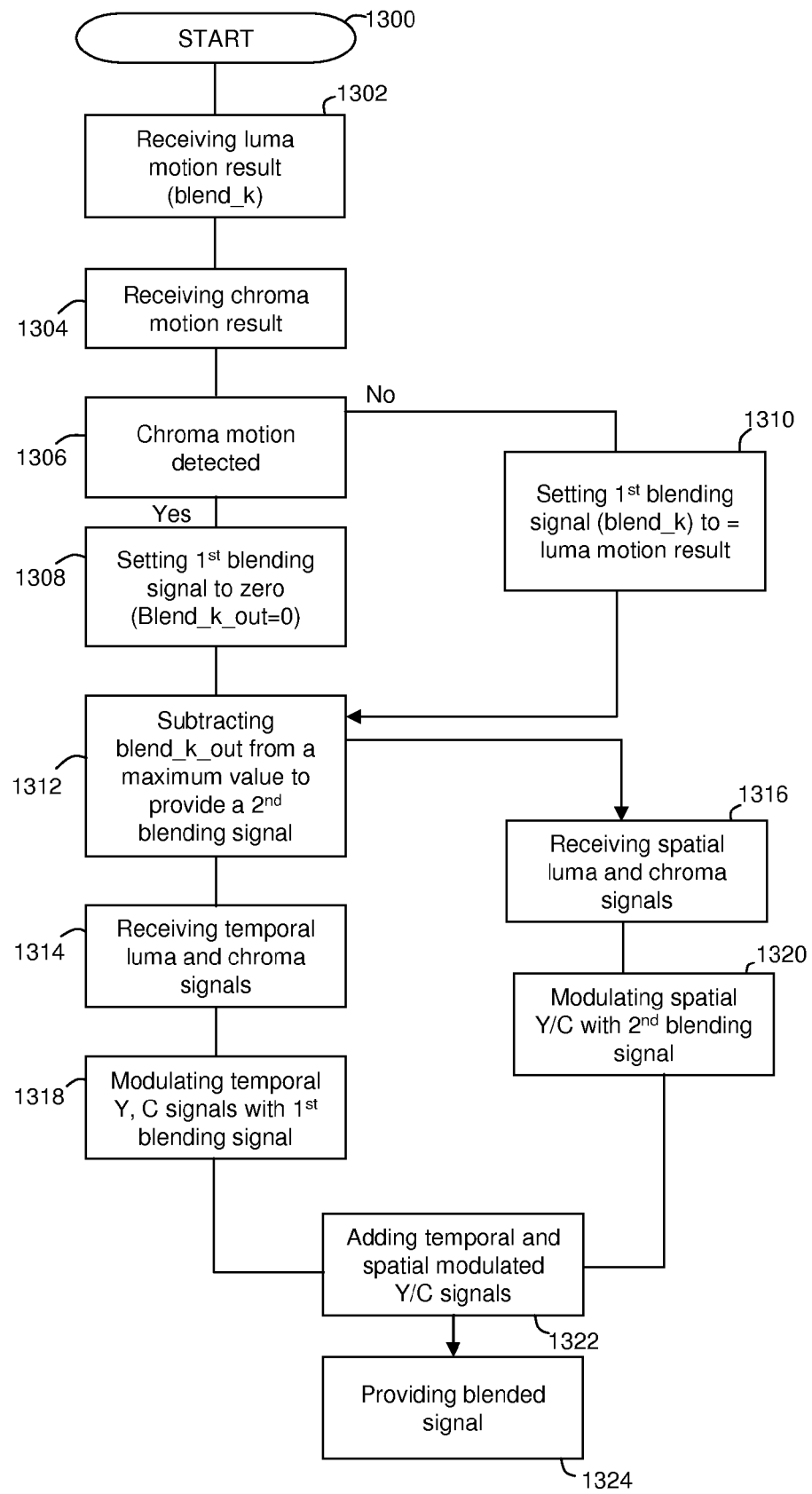
FIG. 13 is a flow chart of an embodiment of a process for blending temporal and spatial components of the CVBS signal according to the invention.

Referring now to FIG. 13, there is illustrated one embodiment of the process 414 of blending the CVBS signal based on the chroma motion result as determined herein. In particular, if chroma motion is detected, as described herein, then only spatial filtered chroma and luma signals (Y/C) are used in blending of the temporal and spatial comb filtered chroma and luma components of the CVBS signal. In other words, referring for example to FIG. 2, only the comb filtered chroma and luma components from the 2D comb filter 102 are blended in the blender 108. Alternatively, if chroma motion is not detected as described herein, then a combination of the spatial comb filtered chroma and luma components, for example, as output by the comb filter 102 of FIG. 2, as well as the temporal chroma and luma components, for example, as output by the temporal comb filter 104, are blended in the blender 108 according to the process 414 as illustrated in FIG. 13 and as is now discussed.

One embodiment of the process 414 for blending the CVBS signal begins at 1300 and includes receiving the luma motion signal result at 1302, for example, as determined by the act 404 of the process of FIG. 4. In addition, the process includes receiving the chroma motion result at 1304, for example, as determined at act 412 of the process of FIG. 4. The blending process 1300 also includes setting a value of a first blending signal based on whether chroma motion has been detected (act 1306). In particular, if chroma motion has not been detected (act 1306 No), then the value of the first blending signal is set to equal the luma motion result at 1310. In contrast, if luma motion is detected (act 1306 Yes), then the value of the first blending signal is set to equal zero at act 1308. At 1312, a value of a second blending signal is determined by subtracting the first blending signal from a maximum value to in effect take the complement of the first blending signal, for example 8 (for a 3-bit digital word). The blending process 414 acts on both the spatial comb filtered chroma and luma components of the CVBS signal and the temporal comb filtered components of the CVBS. In particular, at 1314 the process receives the temporal comb filtered luma and chroma signals and act 1316 the process receives the spatial comb filtered luma and chroma signals. The process modulates the temporal comb filtered chroma and luma components with the first blending signal at 1318, and the process modulates the spatial comb filtered chroma and luma components with the second blending signal at 1320. The process adds the modulated temporal luma and chroma signals to the modulated spatial luma and chroma signals at 1322 and provides at an output the blended CVBS signal at 1324.

Figure 14:
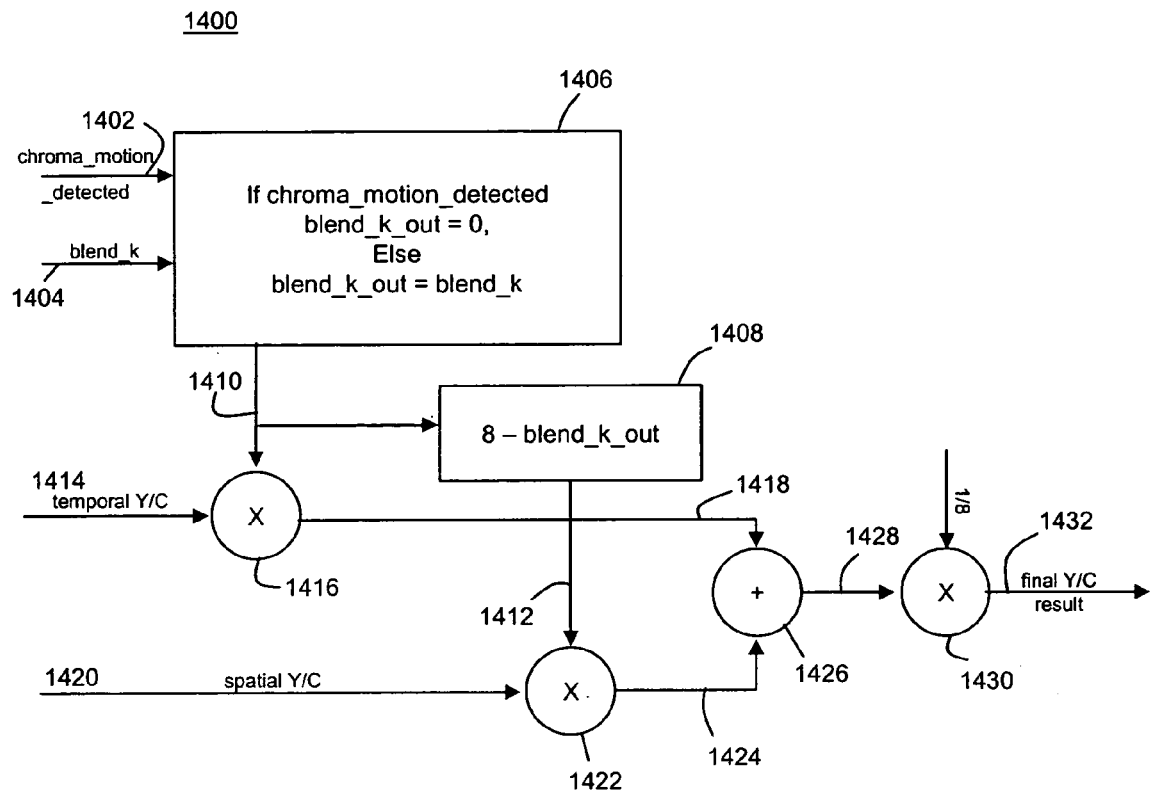
FIG. 14 is an embodiment of a blending device for blending temporal and spatial components of the CVBS signal according to the invention.

Referring now to FIG. 14, there is illustrated one embodiment of a blender 1400 that can be used, for example, as blender 108 in the separator 100 of FIG. 2. The blender 1400 accomplishes the process 414 discussed above with respect to FIG. 13. The blender includes a comparator device 1406 that receives the chroma motion result signal on line 1402 and the luma motion result signal on line 1404. The comparator device determines if chroma motion has been detected and sets the first blending signal (blend_k_out) to zero if chroma motion has been detected, and otherwise sets the first blending signal to the luma motion result. The blending device 1400 also includes a complement device 1408, that receives the first blending signal on line 1410 and determines a difference between a maximum blending value (e.g. 8) and the first blending signal (8-blend_k_out) to provide the second blending signal at output line 1412. The blending device 1400 receives the temporal comb filtered chroma and luma components (Y/C) of the CVBS signal on line 1414 and modulates with modulator 1416, the temporal chroma and luma components with the first blending signal to provide modulated temporal luma and chroma signals on line 1418. The blending device also receives the spatial comb filtered chroma and luma components (Y/C) on line 1420 and modulates with modulator 1422, the spatial luma and chroma components with the second blending signal to provide the modulated spatial luma and chroma components on line 1424. The blending device also includes summing device 1426 which adds the modulated temporal luma and chroma signals to the modulated spatial luma and chroma signals to provide a blended signal at output line 1428. The blended signal on line 1428 is modulated by modulator 1430 with an inverse of the maximum blending value, e.g. ⅛ (for a 3-bit digital word), to provide the final blended chroma and luma signal on line 1432.

Accordingly, as has been discussed herein in particular with respect to FIGS. 13 and 14, it can be seen that the motion detector and process of the present invention determines that chroma motion exists if there is no high frequency luma component within the first and second fields, there is a high frequency temporal energy across the first and second fields and there is chroma across the first and second fields. If chroma motion exists within the CVBS signal, then only spatial comb filtered chroma and luma components of the CVBS signal are blended by the blending device. Alternatively, if chroma motion is not determined within the CVBS signal, then the blending device blends a combination of the spatial comb filtered chroma and luma components and the temporal comb filtered chroma and luma components to provide the final blended chroma and luma signal. It is to be appreciated that the output of the process of FIG. 13 and the blender of FIG. 14 can be converted from the blended chroma and luma signals to RGB signals for display on an analog television set.

Figure 15:
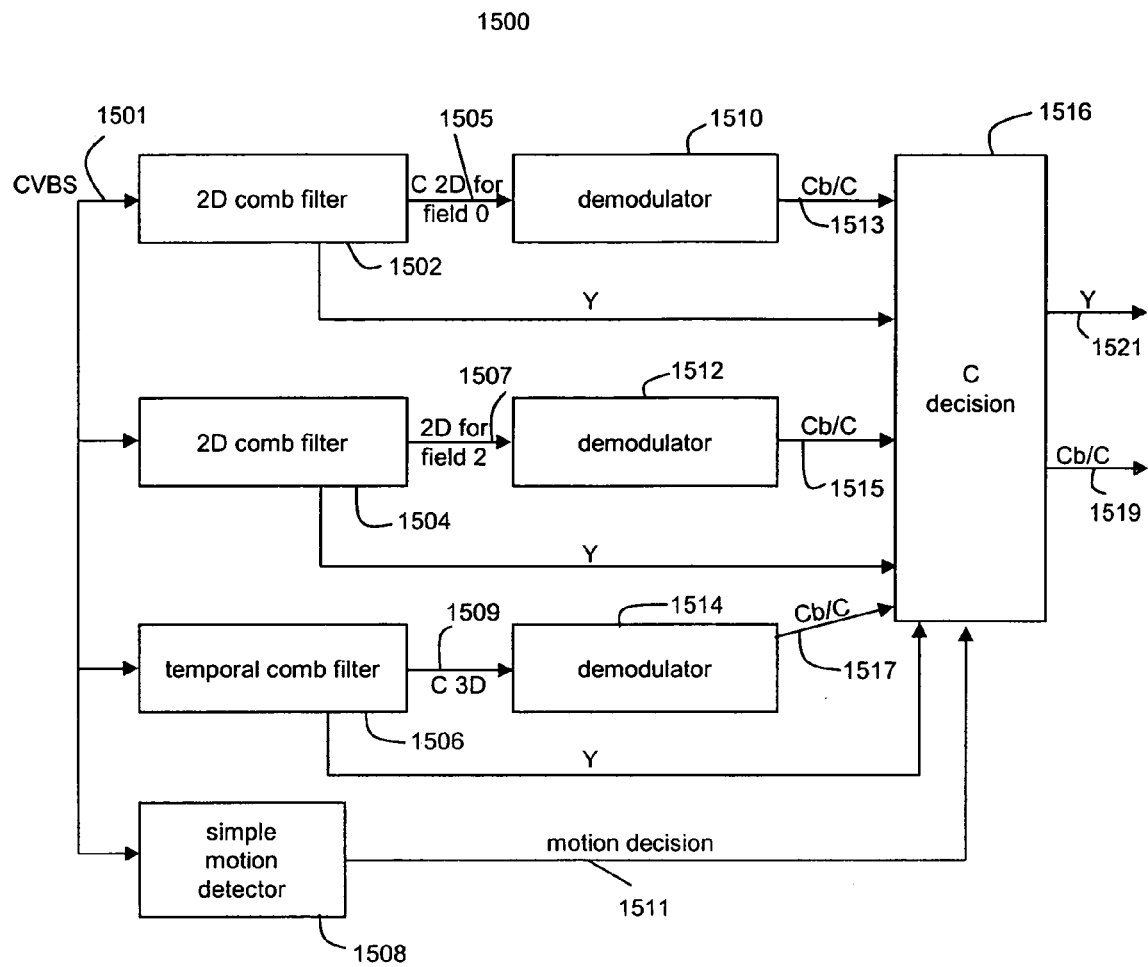
FIG. 15 is a schematic block diagram of an alternate embodiment of a motion detector according to the invention.

Referring now to FIG. 15, there is illustrated a schematic block diagram of an alternate embodiment of a motion detector according to the invention. The motion detector 1500 includes a first 2D comb filter 1502 and a second 2D comb filter 1504. The first 2D comb filter receives the CVBS signal and acts on a first field (field 0) of the CVBS signal to provide, at output line 1505, a spatial comb filtered chroma component of the CVBS signal. The second 2D comb filter receives the CVBS signal on line 1501 and acts on a second field (field 2) of the CVBS signal to provide, at line 1507, a spatial comb filtered chroma component for the second field of the CVBS signal. The motion detector also includes a temporal comb filter 1506 that receives the CVBS signal on line 1501 and temporal comb filters the CVBS signal between the first field and the second field to provide, at output line 1509, a temporal comb filtered chroma signal. The motion detector also includes a simple luma motion detector 1508 that receives the CVBS signal on line 1501 and determines whether luma motion exists within the CVBS signal, for example, as has been discussed herein. The simple luma motion detector provides a motion decision result on line 1511. The motion detector also includes demodulators 1510, 1512, and 1514, which respectively receive the comb filtered signals on lines 1505, 1507, and 1509, and which demodulate the filtered signals to a baseband signal to provide resulting demodulated filtered chroma signals (Cb/C) on respective lines 1513, 1515, and 1517. The motion detector also includes a decision element 1516, which receives the signals on each of lines 1511, 1513, 1515, and 1517, and from these signals determines if there is a substantial difference in all of the signals. In other words, the decision element 1516 determines whether there is a luma motion result on line 1511 that is different from a temporal comb filtered result on line 1517, and that is different from the spatial comb filtered results on lines 1515 and

1513. If the signals are substantially different, the decision element 1516 determines that there is chroma motion within the CVBS signal. It is to be appreciated that the decision element can 1516 can select between either of the spatial filtered chroma and luma components of the CVBS signal and the temporal filtered components of the CVBS. It is to be appreciated that the decision element can also blend the spatial filtered chroma and luma components of the CVBS signal and the temporal filtered components of the CVBS signal, as has been previously described herein. The decision element 1516 can provide the blended chroma and luma components on respective output lines 1519 and 1521.

It is to be appreciated that the alternate embodiment of the motion detector illustrated in FIG. 15 may need more real estate, such as more gates on an integrated circuit, and may also use more accurate first and second 2D comb filters.

Figure 16:
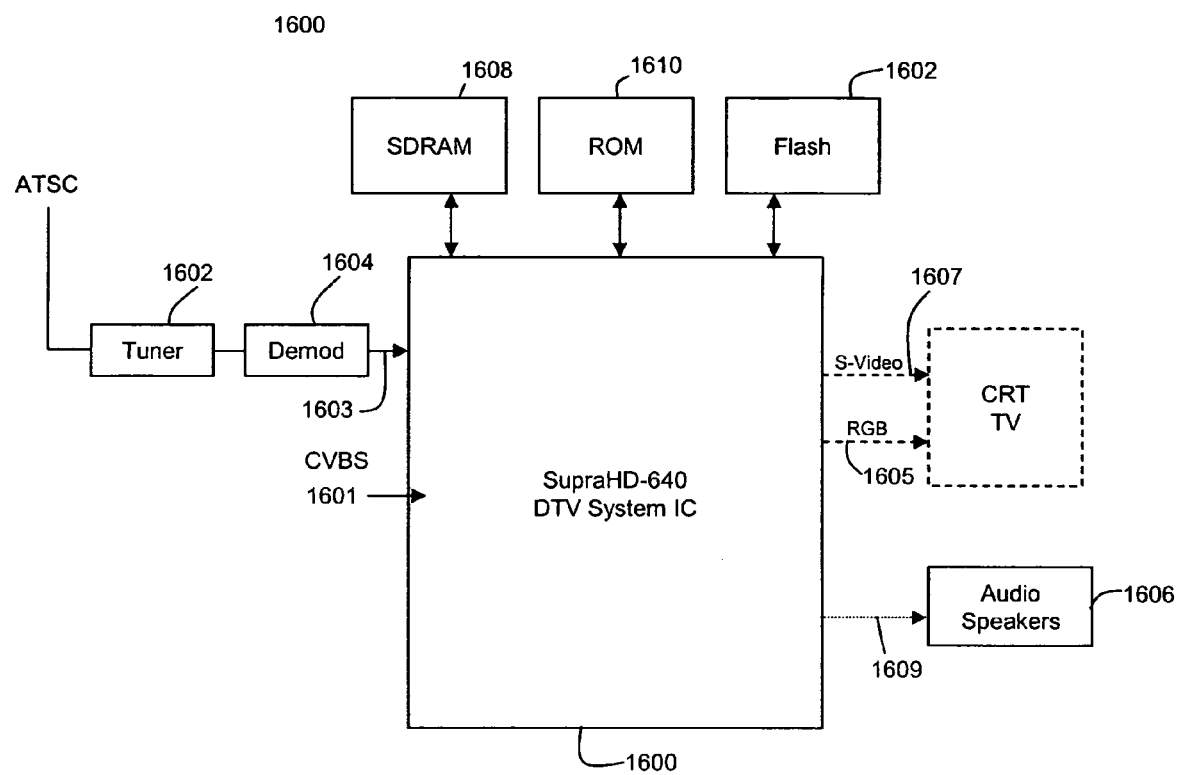
FIG. 16 illustrates a schematic block diagram of one embodiment of a converter device according to the invention.

Referring now to FIG. 16, there is illustrated an embodiment of a converter device 1600 of the invention that can include the motion detector and blender as has been described herein. In particular, one embodiment of the converter device 1600 can receive any of a CVBS signal on line 1601 or a demodulated ATS signal as provided by a combination of an ATSC tuner 1602 and demodulator 1604 on line 1603. It is to be appreciated that the tuner 1602 and the modulator 1604 can be any tuner and demodulator used in the industry, for example, an ATSC/NTSC turner and a Oren 8VSB/QAM demodulator. The device 1600 receives the CVBS signal and converts the CVBS signal to luma and chroma signals as has been described herein that can be provided to an analog TV set. In particular, the device 1600 can provide a CVBS signal which can be in any format used in the industry, such as an S-Video format on line 1607 or an RGB format signal on line 1605. In addition, the device 1600 can provide at an output 1609 left and right components of an audio signal for reproduction by an audio reproduction device 1606. In addition, it is to be appreciated that the converter device 1600 can, for example, be interfaced with other devices such as an SDRAM device, e.g. a DDR SDRAM: 64 MByte 1608, a ROM device 1610, e.g. a BOOT ROM: 32 Kbyte on SPI bus, or a flash memory 1612, e.g. a NOR Flash Memory; 16 MByte. It is further to be appreciated that the input video signal to the converter device can by any video format used in the industry, such as, ATSC/NTSC, CVBS, S-Video, YPbPr, VGA, HDMI, and IEEE-1394. It is to be appreciated that the output video can also be any format used in the industry, such as, CVBS, S-Video, analog YPbPR or RGB.

It is to be appreciated that the herein described invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method acts of the invention can be performed by a programmable processor executing a program of instructions to perform functions of the invention by operating on input data and generating output signals. The invention can be implemented advantageously in one or more computer programs that are executable on a programmable system including at least one programmable processor coupled to receive data and instructions from, and to transmit data and instructions to a data storage system, at least one input device, and at least one output device.

For example, according to some embodiments of the invention, a product, stored on a processor readable medium, for blending a video signal responsive to a chroma motion result, comprises instructions operable to cause a processor to determine whether any chroma motion exists within the video signal and to provide the chroma motion result; to provide a first blending signal based on the chroma motion result; to provide a second blending signal based on the chroma motion result; to modulate temporal filtered luma and chroma components of the video signal with the first blending signal (temporal Y/C×blend_kout) to provide modulated temporal luma and chroma signals; to modulate spatial filtered luma and chroma components of the video signal with the second blending signal to provide modulated spatial luma and chroma signals (8-blend_k_out×spatial Y/C); and to add the modulated temporal luma and chroma signals to the modulated spatial luma and chroma signals to provide a blended video signal.

According to some embodiments of the invention, the product for blending the video signal responsive to the chroma motion result may also comprise instructions operable to cause a processor to, if chroma motion exists, blend only the spatial filtered chroma and luma signals.

According to some embodiments of the invention, the product for blending the video signal responsive to the chroma motion result may also comprise instructions operable to cause a processor to, if chroma motion does not exist, blend a combination of the spatial filtered and the temporal filtered chroma and luma signals.

According to some embodiments of the invention, the product for blending the video signal responsive to the chroma motion result may also comprise instructions operable to cause a processor to, if chroma motion exists, set the first blending signal to zero.

According to some embodiments of the invention, the product for blending the video signal responsive to the chroma motion result may also comprise instructions operable to cause a processor to, if chroma motion does not exist, set the first blending signal to a luma motion result.

According to some embodiments of the invention, the product for blending the video signal responsive to the chroma motion result may also comprise instructions operable to cause a processor to determine a difference between a maximum value and the first blending signal to provide the second blending signal (8-blend_k_out).

According to some embodiments of the invention, the product for blending the video signal responsive to the chroma motion result may also comprise instructions operable to cause a processor to spatial comb filter luma and chroma components of the video signal to provide spatial comb filtered luma and chroma signals.

According to some embodiments of the invention, the product for blending the video signal responsive to the chroma motion result may also comprise instructions operable to cause a processor to temporal comb filter luma and chroma components of the video signal to provide temporal comb filtered luma and chroma signals.

According to some embodiments of the invention, the product for blending the video signal responsive to the chroma motion result may also comprise instructions operable to cause a processor to determine whether there is luma motion between a first field and a second field of the video signal.

According to some embodiments of the invention, the product for blending the video signal responsive to the chroma motion result may also comprise instructions operable to cause a processor to low pass filter the video signal in the first field to provide a first low pass filtered signal; to low pass filter the video signal in the second field to provide a second low pass filtered signal; and to subtract the first low pass filtered signal from the second low pass filtered signal to provide a luma motion signal.

According to some embodiments of the invention, the product for blending the video signal responsive to the chroma motion result may also comprise instructions operable to cause a processor to determine that luma motion exists if the resulting luma motion signal is greater than a threshold value.

According to some embodiments of the invention, the product for blending the video signal responsive to the chroma motion result may also comprise instructions operable to cause a processor to determine whether there is chroma between a first field of the video signal and a second field of the video signal (Camp); to determine whether there is high frequency energy within the first and second fields (Nsum1, Nsum2); and to determine whether there is temporal energy between the first and second fields (Psum1, Psum2).

According to some embodiments of the invention, the product for blending the video signal responsive to the chroma motion result may also comprise instructions operable to cause a processor to compare high frequency data of adjacent lines within a first field of the video signal to determine whether high frequency luma energy exists within the first field; to compare high frequency data of adjacent lines within a second field of the video signal to determine whether high frequency luma energy exists within the second field; to compare high frequency data between the first field and the second field to determine whether temporal energy exists between the first and second fields to compare data between the first field and the second field of the video signal to determine whether chroma exists between the first and second fields; and to provide the chroma motion result based upon these acts of comparing.

According to some embodiments of the invention, the product for blending the video signal responsive to the chroma motion result may also comprise instructions operable to cause a processor to high pass filter the video signal of a first line in the first field to provide a first high pass filtered signal (Hh); to high pass filter the video signal of a second line in the first field to provide a second high pass filtered signal (Gh); to high pass filter the video signal of a third line of the first field to provide a third high pass filtered signal (Ih); to high pass filter the video signal of the first line in the second field to provide a fourth high pass filtered signal (Eh); to high pass filter the video signal of the second line in the second field to provide a fifth high pass filtered signal (Dh); and to high pass filter the video signal of the third line in the second field to provide a sixth high pass filtered signal (Fh).

According to some embodiments of the invention, the product for blending the video signal responsive to the chroma motion result may also comprise instructions operable to cause a processor to add the fifth high pass filtered signal and the fourth high pass filtered signal to provide a first summed signal (Dh+Eh); to add the fourth high pass filtered signal and the sixth high pass filtered signal to provide a second summed signal (Eh+Fh); to determine an absolute value of the first summed signal to provide a first absolute value signal; to determine an absolute value of the second summed signal to provide a second value signal; and to add the first absolute value signal and the second absolute value signal to provide a first high frequency energy signal (Nsum1).

According to some embodiments of the invention, the product for blending the video signal responsive to the chroma motion result may also comprise instructions operable to cause a processor to add the second high pass filtered signal and the first high pass filtered signal to provide a third summed signal (Gh+Hh); to add the first high pass filtered signal and the third high pass filtered signal to provide a fourth summed signal (Hh+Ih); to determine an absolute value of the third summed signal to provide a third absolute value signal; to determine an absolute value of the fourth summed signal to provide a fourth absolute value signal; and to add the third absolute value signal and the fourth absolute value signal to provide a second high frequency energy signal (Nsum2).

According to some embodiments of the invention, the product for blending the video signal responsive to the chroma motion result may also comprise instructions operable to cause a processor to subtract the fifth high pass filtered signal from the fourth high pass filtered signal to provide a first difference signal (Eh−Dh); to subtract the second high pass filtered signal from the first high pass filtered signal to provide a second difference signal (Hh−Gh); to add the first difference signal and the second difference signal to provide a fifth summed signal (Psum); and to determine an absolute value of the fifth summed signal to provide a first temporal energy signal (Psum1).

According to some embodiments of the invention, the product for blending the video signal responsive to the chroma motion result may also comprise instructions operable to cause a processor to subtract the sixth high pass filtered signal from the fourth high pass filtered signal to provide a third difference signal (Eh−Fh); to subtract the third high pass filtered signal from the first high pass filtered signal to provide a fourth difference signal (Hh−Ih); to add the third difference signal and the fourth difference signal to provide a sixth summed signal (Psum); and to determine an absolute value of the sixth summed signal to provide a second temporal energy signal (Psum2).

According to some embodiments of the invention, the product for blending the video signal responsive to the chroma motion result may also comprise instructions operable to cause a processor to subtract the video signal of the second line in the first field (G) from the video signal of the second line in the second field (D) to provide a first inter-field chroma signal (D−G); to subtract the video signal of the first line in the first field (H) from the video signal of the first line in a second field (E) to provide a second inter-field chroma signal (E−H); to subtract the video signal of the third line in the first field (I) from the video signal of the third line in the second field (F) to provide a third inter-field chroma signal (F−I); to determine an absolute value of the first inter-field chroma signal to provide a first inter-field absolute value signal; to determine an absolute value of the second inter-filed chroma signal to provide a second inter-field absolute valve signal; to determine an absolute value of the third inter-field chroma signal to provide a third inter-field absolute value signal; and to add the first inter-field absolute value signal, the second inter-field absolute value signal and the third inter-field absolute value signal to provide a chroma motion signal (Camp).

According to some embodiments of the invention, the product for blending the video signal responsive to the chroma motion result may also comprise instructions operable to cause a processor to average the first high frequency energy signal across a number of pixel windows and the second high frequency energy signal across the number of pixel windows to provide a first average high frequency energy signal and a second average high frequency energy signal (Nsum1_avg, Nsum2_avg).

According to some embodiments of the invention, the product for blending the video signal responsive to the chroma motion result may also comprise instructions operable to cause a processor to average the first temporal energy signal across the number of pixel windows and averaging the second temporal energy signal across the number of pixel windows to provide a first average temporal energy signal and a second average temporal energy signal (Psum1_avg, Psum2_avg).

According to some embodiments of the invention, the product for blending the video signal responsive to the chroma motion result may also comprise instructions operable to cause a processor to determine whether the chroma motion signal is above a threshold value (Camp>Camp_thresh).

According to some embodiments of the invention, the product for blending the video signal responsive to the chroma motion result may also comprise instructions operable to cause a processor to determine which of the first average high frequency signal (Nsum1_avg) and the second average high frequency signal (Nsum2_avg) is lower, to provide the lower signal as an average high frequency signal (Nsum_avg), and to determine whether the average high frequency signal is less than a threshold value (Nsum_avg<Nsum_thresh).

According to some embodiments of the invention, the product for blending the video signal responsive to the chroma motion result may also comprise instructions operable to cause a processor to add the first average temporal energy signal and the second average temporal energy signal to provide a total average temporal energy signal (Psum1_avg+Psum2_avg), and to determine if the total average temporal energy signal is greater than a threshold value (Psum_avg total>Psum_thresh).

According to some embodiments of the invention, the product for blending the video signal responsive to the chroma motion result may also comprise instructions operable to cause a processor to determine that chroma motion exists if each of the conditions Camp>Camp_thresh, Nsum_avg<Nsum_thresh, and Psum_avgtotal>Psum_thresh is true, and to determine that chroma motion does not exist if any of these conditions is not true.

It is to be appreciated that each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described herein. Nevertheless, it will be understood that various modifications may be made without departing from the spirit and scope of the invention. For example, the invention has been described above with reference to NTSC and PAL video signals, which are typically used in broadcasting TV signals, but the invention is also equally applicable to component video, such as a video signal that is output from a DVD player. Accordingly, other embodiments are within the scope of the following claims.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of blending a video signal responsive to a chroma motion result, comprising:

determining whether any chroma motion exists within the video signal and providing the chroma motion result;

providing a first blending signal based on the chroma motion result;

providing a second blending signal based on the chroma motion result;

modulating temporal filtered luma and chroma components of the video signal with the first blending signal to provide modulated temporal luma and chroma signals;

modulating spatial filtered luma and chroma components of the video signal with the second blending signal to provide modulated spatial luma and chroma signals; and adding the modulated temporal luma and chroma signals to the modulated spatial luma and chroma signals to provide a blended video signal.

2. The method of claim 1, wherein if chroma motion exists blending only the spatial filtered chroma and luma signals.

3. The method of claim 1, wherein if chroma motion does not exist, blending a combination of the spatial filtered and the temporal filtered chroma and luma signals.

4. The method of claim 1, wherein if chroma motion exists, setting the first blending signal to zero.

5. The method of claim 1, wherein if chroma motion does not exist, setting the first blending signal to a luma motion result.

6. The method of claim 1, further comprising determining a difference between a maximum value and the first blending signal to provide the second blending signal.

7. The method of claim 1, further comprising spatial comb filtering luma and chroma components of the video signal to provide spatial comb filtered luma and chroma signals.

8. The method of claim 1, further comprising temporal comb filtering luma and chroma components of the video signal to provide temporal comb filtered luma and chroma signals.

9. The method of claim 1, further comprising the act of determining whether there is luma motion between a first field and a second field of the video signal.

10. The method of claim 9, wherein the act of determining whether luma motion exists comprises:

low pass filtering the video signal in the first field to provide a first low pass filtered signal;

low pass filtering the video signal in the second field to provide a second low pass filtered signal; and subtracting the first low pass filtered signal from the second low pass filtered signal to provide a luma motion signal.

11. The method of claim 10, wherein the act of determining whether luma motion exists further comprises determining that luma motion exists if the resulting luma motion signal is greater than a threshold value.

12. The method of claim 1, wherein the act of determining whether there is any chroma motion within the video signal comprises:

determining whether there is chroma between a first field of the video signal and a second field of the video signal;

determining whether there is high frequency energy within the first and second fields; and determining whether there is temporal energy between the first and second fields.

13. The method of claim 1, wherein the act of determining whether there is any chroma motion within the video signal comprises:

comparing high frequency data of adjacent lines within a first field of the video signal to determine whether high frequency luma energy exists within the first field;

comparing high frequency data of adjacent lines within a second field of the video signal to determine whether high frequency luma energy exists within the second field;

comparing high frequency data between the first field and the second field to determine whether temporal energy exists between the first and second fields comparing data between the first field and the second field of the video signal to determine whether chroma exists between the first and second fields; and providing the chroma motion result based upon the acts of comparing.

14. The method of claim 13, wherein the acts of comparing chroma data comprise:

high pass filtering the video signal of a first line in the first field to provide a first high pass filtered signal;

high pass filtering the video signal of a second line in the first field to provide a second high pass filtered signal; and high pass filtering the video signal of a third line of the first field to provide a third high pass filtered signal.

15. The method of claim 14, wherein the acts of comparing chroma data further comprise:

high pass filtering the video signal of the first line in the second field to provide a fourth high pass filtered signal;

high pass filtering the video signal of the second line in the second field to provide a fifth high pass filtered signal; and high pass filtering the video signal of the third line in the second field to provide a sixth high pass filtered signal.

16. The method of claim 15, further comprising the acts of:

adding the fifth high pass filtered signal and the fourth high pass filtered signal to provide a first summed signal;

adding the fourth high pass filtered signal and the sixth high pass filtered signal to provide a second summed signal;

determining an absolute value of the first summed signal to provide a first absolute value signal;

determining an absolute value of the second summed signal to provide a second value signal; and adding the first absolute value signal and the second absolute value signal to provide a first high frequency energy signal.

17. The method of claim 16, further comprising the acts of:

adding the second high pass filtered signal and the first high pass filtered signal to provide a third summed signal;

adding the first high pass filtered signal and the third high pass filtered signal to provide a fourth summed signal;

determining an absolute value of the third summed signal to provide a third absolute value signal;

determining an absolute value of the fourth summed signal to provide a fourth absolute value signal; and adding the third absolute value signal and the fourth absolute value signal to provide a second high frequency energy signal.

18. The method of claim 17, further comprising:

subtracting the fifth high pass filtered signal from the fourth high pass filtered signal to provide a first difference signal;

subtracting the second high pass filtered signal from the first high pass filtered signal to provide a second difference signal;

adding the first difference signal and the second difference signal to provide a fifth summed signal; and determining an absolute value of the fifth summed signal to provide a first temporal energy signal.

19. The method of claim 18, further comprising:
  subtracting the sixth high pass filtered signal from the fourth high pass filtered signal to provide a third difference signal;
  subtracting the third high pass filtered signal from the first high pass filtered signal to provide a fourth difference signal;
  adding the third difference signal and the fourth difference signal to provide a sixth summed signal; and
  determining an absolute value of the sixth summed signal to provide a second temporal energy signal.

20. The method of claim 19, wherein the act of comparing chroma data from the first field and the second field comprises:
  subtracting the video signal of the second line in the first field from the video signal of the second line in the second field to provide a first inter-field chroma signal;
  subtracting the video signal of the first line in the first field from the video signal of the first line in a second field to provide a second inter-field chroma signal;
  subtracting the video signal of the third line in the first field from the video signal of the third line in the second field to provide a third inter-field chroma signal;
  determining an absolute value of the first inter-field chroma signal to provide a first inter-field absolute value signal;
  determining an absolute value of the second inter-filed chroma signal to provide a second inter-field absolute valve signal;
  determining an absolute value of the third inter-field chroma signal to provide a third inter-field absolute value signal; and
  adding the first inter-field absolute value signal, the second inter-field absolute value signal and the third inter-field absolute value signal to provide a chroma motion signal.

21. The method of claim 20, further comprising averaging the first high frequency energy signal across a number of pixel windows and the second high frequency energy signal across the number of pixel windows to provide a first average high frequency energy signal and a second average high frequency energy signal.

22. The method as claimed in claim 21, further comprising averaging the first temporal energy signal across the number of pixel windows and averaging the second temporal energy signal across the number of pixel windows to provide a first average temporal energy signal and a second average temporal energy signal.

23. The method of claim 22, further comprising determining whether the chroma motion signal is above a threshold value.

24. The method of claim 23, further comprising:
  determining which of the first average high frequency signal and the second average high frequency signal is lower, and providing the lower signal as an average high frequency signal; and
  determining whether the average high frequency signal is less than a threshold value.

25. The method of claim 24, further comprising:
  adding the first average temporal energy signal and the second average temporal energy signal to provide a total average temporal energy signal; and
    determining if the total average temporal energy signal is greater than a threshold value.

26. The method of claim 25, further comprising:
  determining that chroma motion exists if each of the conditions of claims 23-25 is true; and
  determining that chroma motion does not exist if any of the conditions of claims 23-25 is not true.

27. A blender that blends a video signal responsive to a chroma motion result, comprising:
  a motion detector that detects whether any chroma motion exists within the video signal and provides the chroma motion result;
  a selector, responsive to the chroma motion result and a luma motion signal, that provides a first blending signal and a second blending signal based on the chroma motion result;
  a first modulator that receives temporal filtered luma and chroma components of the video signal and the first blending signal, that modulates the temporal filtered luma and chroma components of the video signal with the first blending signal to provide modulated temporal luma and chroma signals;
  a second modulator that receives spatial filtered luma and chroma components of the video signal and the second blending signal, that modulates the spatial filtered luma and chroma components of the video signal with the second blending signal to provide modulated spatial luma and chroma signals; and
  a first summing device that adds the modulated temporal luma and chroma signals to the modulated spatial luma and chroma signals to provide a blended video signal.

28. The blender of claim 27, wherein if chroma motion exists, the blender blends only the spatial filtered chroma and luma signals.

29. The blender of claim 27, wherein if chroma motion does not exist, the blender blends a combination of the spatial filtered and the temporal filtered chroma and luma signals.

30. The blender of claim 27, wherein if chroma motion exists, the selector sets the first blending signal to zero.

31. The blender of claim 27, wherein if chroma motion does not exist, the selector sets the first blending signal to a luma motion result.

32. The blender of claim 27, a complement device that determines a difference between a maximum value and the first blending signal to provide the second blending signal.

33. The blender of claim 27, further comprising a spatial comb filter that comb filters luma and chroma components of the video signal to provide spatial comb filtered luma and chroma signals.

34. The blender of claim 27, further comprising a temporal comb filter that comb filters luma and chroma components of the video signal to provide temporal comb filtered luma and chroma signals.

35. The blender of claim 27, wherein the motion comprises a luma motion detector that determines whether there is luma motion between a first field and a second field of the video signal.

36. The blender of claim 35, wherein the luma motion detector comprises:
  a first low pass filter that low-pass filters the video signal in the first field to provide a first low pass filtered signal;
  a second low pass filter that low-pass filters the video signal in the second field to provide a second low pass filtered signal; and
  a summing device that subtracts the first low pass filtered signal from the second low pass filtered signal to provide a luma motion signal.

37. The blender of claim 36, wherein the luma motion detector is configured to determine that luma motion exists if the resulting luma motion signal is greater than a threshold value.

38. The blender of claim 27, wherein the motion detector is configured to determine whether there is any chroma motion within the video signal by performing the acts of:

determining whether there is chroma between a first field of the video signal and a second field of the video signal;
determining whether there is high frequency luma component energy within the first and second fields; and
determining whether there is temporal energy between the first and second fields.

39. The blender of claim 27, wherein the motion detector comprises:
a comparator that is configured to compare high frequency data of adjacent lines within a first field of the video signal to determine whether high frequency luma energy exists within the first field;
the comparator is also configured to compare high frequency data of adjacent lines within a second field of the video signal to determine whether high frequency luma energy exists within the second field;
the comparator is also configured to compare high frequency chroma data between the first field and the second field of the video signal to determine whether temporal energy exists between the first and second fields; and
the comparator is also configured to compare data between the first field and the second field of the video signal to determine whether chroma exists between the first and second fields.

40. The blender of claim 39, wherein the motion detector further comprises:
a high pass filter that high pass filters the video signal of a first line in the first field to provide a first high pass filtered signal;
the high pass filter that high pass filters the video signal of a second line in the first field to provide a second high pass filtered signal; and
the high pass filter that high pass filters the video signal of a third line of the first field to provide a third high pass filtered signal.

41. The blender of claim 40, wherein the motion detector further comprises:
the high pass filter that high pass filters the video signal of the first line in the second field to provide a fourth high pass filtered signal;
the high pass filter that high pass filters the video signal of the second line in the second field to provide a fifth high pass filtered signal; and
the high pass filter that high pass filters the video signal of the third line in the second field to provide a sixth high pass filtered signal.

42. The blender of claim 41, wherein the motion detector further comprises:
a second summing device that adds the fifth high pass filtered signal and the fourth high pass filtered signal to provide a first summed signal;
the second summing device that adds the fourth high pass filtered signal and the sixth high pass filtered signal to provide a second summed signal;
a first absolute value device that determines an absolute value of the first summed signal to provide a first absolute value signal;
the first absolute value device that determines an absolute value of the second summed signal to provide a second absolute value signal; and
the second summing device that adds the first absolute value signal and the second absolute value signal to provide a first high frequency energy signal.

43. The blender of claim 42, wherein the motion detector further comprises:
the second summing device that adds the second high pass filtered signal and the first high pass filtered signal to provide a third summed signal;
the second summing device that adds the first high pass filtered signal and the third high pass filtered signal to provide a fourth summed signal;
the first absolute value device that determines an absolute value of the third summed signal to provide a third absolute value signal;
the first absolute value device that determines an absolute value of the fourth summed signal to provide a fourth absolute value signal; and
the second summing device that adds the third absolute value signal and the fourth absolute value signal to provide a second high frequency energy signal.

44. The blender of claim 43, wherein the motion detector further comprises:
the first absolute value device that subtracts the fifth high pass filtered signal from the fourth high pass filtered signal to provide a first difference signal;
the second summing device that subtracts the second high pass filtered signal from the first high pass filtered signal to provide a second difference signal;
the second summing device that adds the first difference signal and the second difference signal to provide a fifth summed signal; and
the first absolute value device that determines an absolute value of the fifth summed signal to provide a first temporal energy signal.

45. The blender of claim 44, wherein the motion detector further comprises:
the second summing device that subtracts the sixth high pass filtered signal from the fourth high pass filtered signal to provide a third difference signal;
the second summing device that subtracts the third high pass filtered signal from the first high pass filtered signal to provide a fourth difference signal;
the second summing device that adds the third difference signal and the fourth difference signal to provide a sixth summed signal; and
the first absolute value device that determines an absolute value of the sixth summed signal to provide a second temporal energy signal.

46. The blender of claim 45, wherein the motion detector further comprises:
the second summing device that subtracts the video signal of the second line in the first field from the video signal of the second line in the second field to provide a first inter-field chroma signal;
the second summing device that subtracts the video signal of the first line in the first field from the video signal of the first line in a second field to provide a second inter-field chroma signal;
the second summing device that subtracts the video signal of the third line in the first field from the video signal of the third line in the second field to provide a third inter-field chroma signal;
the first absolute value device that determines an absolute value of the first inter-field chroma signal to provide a first inter-field absolute value signal;
the first absolute value device that determines an absolute value of the second inter-filed chroma signal to provide a second inter-field absolute valve signal;
the first absolute value device that determines an absolute value of the third inter-field chroma signal to provide a third inter-field absolute value signal; and the second summing device that adds the first inter-field absolute value signal, the second inter-field absolute value signal and the third inter-field absolute value signal to provide a chroma motion signal.

47. The blender of claim 46, wherein the motion detector further comprises an averaging device that averages the first high frequency energy signal across a number of pixel windows and the second high frequency energy signal across the number of pixel windows to provide a first average high frequency energy signal and a second average high frequency energy signal.

48. The blender of claim 47, wherein the motion detector further comprises the averaging device that averages the first temporal energy signal across the number of pixel windows and averaging the second temporal energy signal across the number of pixel windows to provide a first average temporal energy signal and a second average temporal energy signal.

49. The blender of claim 48, wherein the comparator determines whether the chroma motion signal is above a threshold value.

50. The blender of claim 49, wherein the comparator determines:

which of the first average high frequency signal and the second average high frequency signal is lower, and provides the lower signal as an average high frequency signal; and whether the average high frequency signal is less than a threshold value.

51. The blender of claim 50, wherein the motion detector further comprises:

the second summing device that adds the first average temporal energy signal and the second average temporal energy signal to provide a total average temporal energy signal; and the comparator determines if the total average temporal energy signal is greater than a threshold value.

52. The blender of claim 51, wherein the comparator determines:

that chroma motion exists if each of the conditions of claims 49-51 is true; and that chroma motion does not exist if any of the conditions of claims 49-51 is not true.

* * * * *